US011405624B2

(12) United States Patent
Yamamoto et al.

(10) Patent No.: US 11,405,624 B2
(45) Date of Patent: Aug. 2, 2022

(54) DECODING DEVICE, CODING DEVICE, AND METHOD

(71) Applicant: SHARP KABUSHIKI KAISHA, Sakai (JP)

(72) Inventors: Tomoyuki Yamamoto, Sakai (JP); Tomohiro Ikai, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/234,577

(22) Filed: Apr. 19, 2021

(65) Prior Publication Data

US 2021/0243459 A1 Aug. 5, 2021

Related U.S. Application Data

(63) Continuation of application No. 16/381,929, filed on Apr. 11, 2019, now Pat. No. 11,032,557, which is a (Continued)

(30) Foreign Application Priority Data

Jul. 15, 2010 (JP) .............................. JP2010-160861

(51) Int. Cl.
*H04N 19/196* (2014.01)
*H04N 19/593* (2014.01)
(Continued)

(52) U.S. Cl.
CPC ......... *H04N 19/196* (2014.11); *H04N 19/197* (2014.11); *H04N 19/44* (2014.11);
(Continued)

(58) Field of Classification Search
CPC ............. H04N 19/00569; H04N 19/44; H04N 19/463; H04N 19/197; H04N 19/593; H04N 19/11; H04N 19/70
See application file for complete search history.

(56) References Cited

U.S. PATENT DOCUMENTS

RE43,567 E    8/2012   Sun et al.
2001/0005432 A1*   6/2001   Takahashi ................ G06T 9/20
382/243
(Continued)

FOREIGN PATENT DOCUMENTS

JP    2005-528047 A    9/2005
JP    2009-248975 A    10/2009
(Continued)

OTHER PUBLICATIONS

Joint Collaborative Team on Video Coding(JCT-VC) of ITU-T SG16 WP3 and ISO/IEC JTC1/SC29/WG11, "Test Model under Consideration", JCTVC-A205, 2010, pp. 1,48-50, 94.
(Continued)

*Primary Examiner* — Joseph Suh
(74) *Attorney, Agent, or Firm* — Birch, Stewart, Kolasch & Birch, LLP

(57) ABSTRACT

A moving image decoder (1) includes an intermediate estimated prediction mode deriving section (124) for transforming a prediction mode of each neighbor partition into an intermediate prediction mode included in an intermediate prediction set which is a sum of prediction sets (PS); and an estimated prediction mode deriving section (125) for deriving an estimated prediction mode by estimating a prediction mode of a target partition based on the intermediate prediction mode of each neighbor partition which is obtained by the transform.

3 Claims, 20 Drawing Sheets

Related U.S. Application Data continuation of application No. 15/897,992, filed on Feb. 15, 2018, now Pat. No. 10,313,689, which is a continuation of application No. 13/809,272, filed as application No. PCT/JP2011/066056 on Jul. 14, 2011, now Pat. No. 9,930,331.

(51) Int. Cl.
*H04N 19/463* (2014.01)
*H04N 19/44* (2014.01)
*H04N 19/70* (2014.01)
*H04N 19/11* (2014.01)

(52) U.S. Cl.
CPC ......... *H04N 19/463* (2014.11); *H04N 19/593* (2014.11); *H04N 19/11* (2014.11); *H04N 19/70* (2014.11)

(56) References Cited

U.S. PATENT DOCUMENTS

| | | | | |
|---|---|---|---|---|
| 2001/0019631 | A1* | 9/2001 | Ohsawa | G06T 7/12 |
| | | | | 382/242 |
| 2003/0223495 | A1* | 12/2003 | Sun | H04N 19/197 |
| | | | | 375/240.12 |
| 2003/0223496 | A1* | 12/2003 | Sun | H04N 19/11 |
| | | | | 375/240.12 |
| 2003/0223645 | A1* | 12/2003 | Sun | H04N 19/196 |
| | | | | 382/239 |
| 2003/0231795 | A1* | 12/2003 | Karczewicz | H04N 19/196 |
| | | | | 382/238 |
| 2005/0232363 | A1* | 10/2005 | Lee | H04N 19/593 |
| | | | | 375/240.24 |
| 2006/0013320 | A1* | 1/2006 | Oguz | H04N 19/61 |
| | | | | 375/240.27 |
| 2006/0209948 | A1* | 9/2006 | Bialkowski | H04N 19/176 |
| | | | | 375/240.2 |
| 2007/0211798 | A1* | 9/2007 | Boyce | H04N 19/33 |
| | | | | 375/240.16 |
| 2008/0175318 | A1 | 7/2008 | Sun et al. | |
| 2008/0175319 | A1 | 7/2008 | Sun et al. | |
| 2008/0175320 | A1 | 7/2008 | Sun et al. | |
| 2008/0175321 | A1* | 7/2008 | Sun | H04N 19/60 |
| | | | | 375/240.15 |
| 2009/0161757 | A1* | 6/2009 | Yu | H04N 19/159 |
| | | | | 375/240.03 |
| 2009/0245371 | A1* | 10/2009 | Choi | H04N 19/11 |
| | | | | 375/240.13 |
| 2010/0208802 | A1* | 8/2010 | Tsukuba | H04N 19/174 |
| | | | | 375/240.12 |
| 2010/0309977 | A1* | 12/2010 | Andersson | H04N 19/157 |
| | | | | 375/240.12 |

FOREIGN PATENT DOCUMENTS

| | | |
|---|---|---|
| JP | 2009-284275 A | 12/2009 |
| WO | WO 2009/004985 A1 | 1/2009 |
| WO | WO 2009/110753 A2 | 9/2009 |

OTHER PUBLICATIONS

McCann et al., Joint Collaborative Team on Video Coding (JCT-VC) of ITU-T SG16 WP3 and ISO/IEC JTC1/SC29/WG11,"Samsung's Response to the Call for Proposals on Video Compression Technology", JCTVC-A124, 2010, pp. 1-40.
Recommendation ITU-T H.264, "Advanced video coding for generic audiovisual services", Series H: Audiovisual and Multimedia Systems, Infrastructure of audiovisual services—Coding of moving video, 2009, pp. 96-103, 131-133, 138-139.
Advisory Action issued in corresponding U.S. Appl. No. 16/381,929 dated Dec. 22, 2020.
Advisory Action issued in the copending U.S. Appl. No. 13/809,272, dated Feb. 11, 2016.
Advisory Action issued in the copending U.S. Appl. No. 13/809,272, dated Jan. 12, 2017.
Notice of Allowance issued in corresponding U.S. Appl. No. 16/381,929 dated Feb. 12, 2021.
Notice of Allowance issued in the copending U.S. Appl. No. 13/809,272, dated Nov. 3, 2017.
Notice of Allowance issued in the copending U.S. Appl. No. 15/897,992, dated Jan. 17, 2019.
Office Action issued in corresponding U.S. Appl. No. 16/381,929 dated Jul. 13, 2020.
Office Action issued in corresponding U.S. Appl. No. 16/381,929 dated Nov. 2, 2020.
Office Action issued in the copending U.S. Appl. No. 13/809,272, dated Apr. 26, 2016.
Office Action issued in the copending U.S. Appl. No. 13/809,272, dated Mar. 28, 2017.
Office Action issued in the copending U.S. Appl. No. 13/809,272, dated May 18, 2015.
Office Action issued in the copending U.S. Appl. No. 13/809,272, dated Oct. 19, 2015.
Office Action issued in the copending U.S. Appl. No. 13/809,272, dated Sep. 28, 2016.

* cited by examiner

| IDs | Prediction modes |
|---|---|
| 0 | angle(0) |
| 1 | angle(-45) |
| 2 | angle(-90) |
| 3 | DC |
| 4 | Plane |

(b) PS2

| IDs | Prediction modes |
|---|---|
| 0 | angle(22.5) |
| 1 | angle(0) |
| 2 | angle(-22.5) |
| 3 | angle(-45) |
| 4 | angle(-67.5) |
| 5 | angle(-90) |
| 6 | angle(-112.5) |
| 7 | angle(-135) |
| 8 | DC |

(c) PS3

| IDs | Prediction modes |
|---|---|
| 0 | angle(22.5) |
| 1 | angle(11.25) |
| 2 | angle(0) |
| 3 | angle(-11.25) |
| 4 | angle(-22.5) |
| 5 | angle(-33.75) |
| 6 | angle(-45) |
| 7 | angle(-56.25) |
| 8 | angle(-67.5) |
| 9 | angle(-79.75) |
| 10 | angle(-90) |
| 11 | angle(-101.25) |
| 12 | angle(-112.5) |
| 13 | angle(-123.75) |
| 14 | angle(-135) |
| 15 | DC |
| 16 | Plane |

(a) TBL1

| Prediction mode ID | Intermediate prediction mode ID |
|---|---|
| 0 | 2 |
| 1 | 6 |
| 2 | 10 |
| 3 | 15 |
| 4 | 16 |

(b) TBL2

| Prediction mode ID | Intermediate prediction mode ID |
|---|---|
| 0 | 0 |
| 1 | 2 |
| 2 | 4 |
| 3 | 6 |
| 4 | 8 |
| 5 | 10 |
| 6 | 12 |
| 7 | 14 |
| 8 | 15 |

(c) TBL3

| Prediction mode ID | Intermediate prediction mode ID |
|---|---|
| k | k |

F I G. 1 0

| ID | Intermediate prediction mode |
|---|---|
| 0 | angle(22.5) |
| 1 | angle(11.25) |
| 2 | angle(0) |
| 3 | angle(-11.25) |
| 4 | angle(-22.5) |
| 5 | angle(-33.75) |
| 6 | angle(-45) |
| 7 | angle(-56.25) |
| 8 | angle(-67.5) |
| 9 | angle(-79.75) |
| 10 | angle(-90) |
| 11 | angle(-101.25) |
| 12 | angle(-112.5) |
| 13 | angle(-123.75) |
| 14 | angle(-135) |
| 15 | DC |
| 16 | Plane |

| flag_bit | rem_bits | m |
|---|---|---|
| 1 | – | p |
| 0 | k | (decimal(k,n)<p) ? decimal(k,n) : decimal(k,n)+1 |

F I G. 1 6

| Condition | flag_bit | rem_bits |
|---|---|---|
| m = p | 1 | N/A |
| m < p | 0 | binary(m, n) |
| m > p | 0 | binary(m-1, n) |

| Prediction classification ($e_t$) | Prediction characteristic parameter ($e_p$) | Prediction mode |
|---|---|---|
| Directional | 22.5 | angle(22.5) |
| Directional | 11.25 | angle(11.25) |
| Directional | 0 | angle(0) |
| Directional | -11.25 | angle(-11.25) |
| ⋮ | ⋮ | ⋮ |
| Directional | -123.75 | angle(-123.75) |
| Directional | -135 | angle(-135) |
| Planar | 0 | DC |
| Planar | 1 | Plane |

F I G. 2 1
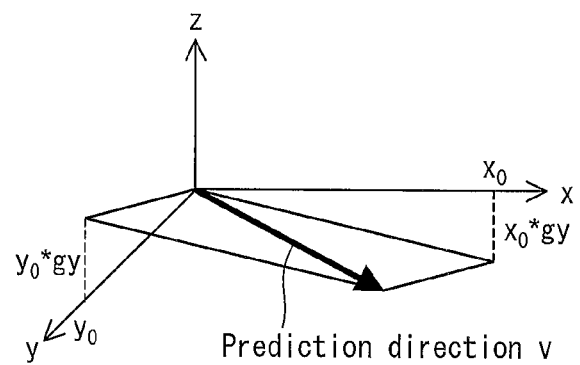

DECODING DEVICE, CODING DEVICE, AND METHOD

CROSS-REFERENCE PARAGRAPH TO RELATED APPLICATIONS

This application is a Continuation of U.S. application Ser. No. 16/381,929, filed on Apr. 11, 2019, which is a continuation of U.S. application Ser. No. 15/897,992, filed on Feb. 15, 2018, now U.S. Pat. No. 10,313,689, issued Jun. 4, 2019, which is a continuation of U.S. application Ser. No. 13/809, 272, filed on Jan. 9, 2013, now U.S. Pat. No. 9,930,331, issued Mar. 27, 2018, which was filed as PCT International Application No. PCT/JP2011/066056 on Jul. 14, 2011, which claims the benefit under 35 U.S.C. § 119(a) to Patent Application No. 2010-160861, filed in Japan on Jul. 15, 2010, all of which are hereby expressly incorporated by reference into the present application.

TECHNICAL FIELD

The present invention relates to a coding device for coding an image and a decoding device for decoding a coded image.

BACKGROUND ART

In order to transmit or record a moving image efficiently, there are used a moving image encoder for coding a moving image so as to generate coded data and a moving image decoder for decoding the coded data so as to generate a decoded image. Specific examples of a moving image coding method include H.264/MPEG-4 AVC (described in Non-patent Literature 1) and a method employed in KTA software which is a joint development codec in VCEG (Video Coding Expert Group).

In such a coding method, images (pictures) constituting a moving image are managed in a hierarchical structure constituted by (i) slices into which each of the images is divided, (ii) macroblocks into which each of the slices is divided, and (iii) blocks into which each of the macroblocks is divided. The encoding is carried out per block.

Further, in such a coding method, a predicted image is generally generated on the basis of a locally-decoded image obtained by coding/decoding an input image. Difference data between the predicted image and the input image is coded. Further, examples of a method of generating a predicted image include a method called "inter-frame prediction (inter prediction)" and a method called "intra-frame prediction (intra prediction)".

In the intra prediction, predicted images in a frame are sequentially generated on the basis of a locally-decoded image in the frame. Specifically, the intra prediction is generally carried out in such a manner that one of prediction directions included in a predetermined prediction direction (prediction mode) group is selected for each of a plurality of prediction units (e.g., block), and a pixel value of a reference pixel in a locally-decoded image is extrapolated in the one of prediction directions thus selected, so that a prediction pixel value(s) on a prediction target region is generated. Furthermore, in the inter prediction, motion compensation employing a motion vector is applied to a reference image in a totally decoded reference frame (decoded image), so that a predicted image in a prediction target frame is generated for each of a plurality of prediction units (e.g. block).

Furthermore, recently, for the intra-prediction, various methods have been proposed as candidates for test models in order to carry out highly accurate prediction in accordance with properties of a local image (Non-patent Literature 2).

For example, Non-patent Literature 2 discloses intra-prediction methods such as ADI (Arbitrary Directional Intra), DC prediction, Angular Prediction, and Edge Based Prediction.

ADI includes a planar prediction and a directional prediction. Examples of the planar prediction include DC (Direct Current) prediction, Plane prediction, and Bi-linear prediction. For the directional prediction, directions such as a horizontal direction, a vertical direction, and other twenty eight directions are defined.

Furthermore, for the Angular Prediction, a DC prediction and directional predictions of thirty three directions are defined. For the Edge Based Prediction, a directional prediction that carries out estimation using a value of a neighbor pixel is defined.

A coding efficiency increases by selecting a suitable intra-prediction method (hereinafter merely referred to as prediction mode) in accordance with properties of a local image.

Furthermore, Non-patent Literature 3 has a description regarding ADI, similarly with Non-patent Literature 2. In particular, Non-patent Literature 3 describes increasing a coding efficiency by switching applicable prediction modes in accordance with a block size of a target block.

CITATION LIST

Non-Patent Literatures

Non-patent Literature 1
"Recommendation ITU-T H.264", Telecommunication Standardization Sector of ITU, March 2009 (published on March, 2009)
Non-patent Literature 2
"JCTVCA-A205 (draft002)", Joint Collaborative Team on Video Coding (JCT-VC) of ITU-T SG16 WP3 and ISO/IEC JTC1/SC29/WG11, 1st Meeting: Dresden, DE, April 2010 (published on April, 2010)
Non-patent Literature 3
"JCTVCA-A124", Joint Collaborative Team on Video Coding(JCT-VC) of ITU-T SG16 WP3 and ISO/IEC JTC1/SC29/WG11,1st Meeting: Dresden, DE, April 2010 (published on April, 2010)

SUMMARY OF INVENTION

Technical Problem

In the intra-prediction, coding based on a prediction mode is carried out in such a manner that a prediction mode is estimated and coding is carried out based on the estimated prediction mode.

However, there is a problem that since an applicable prediction mode may be different with respect to each region, accuracy of the estimated prediction mode is not sufficient.

The estimated prediction mode is derived with use of blocks neighboring to the left side and upper side respectively of a target block to be intra-predicted. Since applicable prediction modes are different between the respective neighbor blocks, there is a case where a prediction mode estimated from the neighbor blocks does not match a prediction mode applicable to the target block.

In order to deal with this problem, Non-patent Literature 2 proposes grouping prediction modes with similar properties into one and deriving estimated prediction modes which are prediction modes representing individual groups, respectively.

Specifically, in Non-patent Literature 2, prediction modes are classified into nine groups (one group for planar prediction and eight groups for directional predictions), and a group (pred_group) to which a prediction mode of interest (mode) belongs is obtained based on PredGroup function (pred_group=PredGroup(mode)).

Furthermore, with respect to each group, a prediction mode which represents that group is set, and the prediction mode representing that group is obtained based on MostProbableInGroup function (MostProbableInGroup (Pred_group)).

In Non-patent Literature 2, an estimated prediction mode (estimated_mode) is derived based on a formula below.

$$\text{estimated\_mode}=\text{MostProbableInGroup}(\text{Min}(\text{PredGroup}(\text{modeA}),\text{PredGroup}(\text{modeB})))$$

In this formula, modeA indicates a prediction mode of a left block and modeB indicates a prediction mode of an upper block. The MostProbableInGroup function derives, from one of the prediction modes of the left block and the upper block, an estimated prediction mode (estimated_mode) by using a prediction mode which represents a group to which the one of the prediction modes belongs.

With reference to FIGS. 22 to 24, the following schematically explains an intra-coding method called ADI described in Non-patent Literatures 2 and 3. (a) to (c) of FIG. 22 each exemplify a set of prediction modes applicable to each block size, i.e. a prediction set.

(a) of FIG. 22 exemplifies a prediction set PS100 for 32×32 or 16×16 block size. The prediction set PS100 includes fifteen kinds of directional predictions (prediction modes IPM100 to IPM114), a DC prediction (prediction mode IPM115), a plane prediction (prediction mode IPM116), and a bilinear prediction (prediction mode IPM117).

(b) of FIG. 22 exemplifies a prediction set PS200 for 8×8 or 4×4 block size. The prediction set PS200 includes eight kinds of directional predictions (prediction modes IPM200 to IPM207) and a DC prediction (prediction mode IPM208).

(c) of FIG. 22 exemplifies a prediction set PS300 for 128×128 or 64×64 block size. The prediction set PS300 includes three kinds of directional predictions (prediction modes IPM300 to IPM302), a DC prediction (prediction mode IPM303), and a plane prediction (prediction mode IPM304).

In (a) to (c) of FIG. 22, the prediction modes IPM100 to IPM114, IPM200 to IPM207, and IPM300 to IPM302 are indicated by arrows. This is because they are directional predictions. That is, the directions of these arrows indicate prediction directions of those prediction modes.

The PredGroup function maps, on nine kinds of prediction groups G1 to G9 shown in FIG. 23 for example, prediction modes of neighbor blocks to be referred to when estimating a prediction mode. As shown in FIG. 23, the nine kinds of prediction groups G1 to G9 each have a prediction mode which represents individual groups.

Each of the prediction modes representing the prediction groups G1 to G8 respectively is a directional prediction. That is, each of the arrows of the prediction groups G1 to G8 indicates a prediction direction of a prediction mode representing each group. The prediction mode representing the prediction group G9 is a DC prediction.

Accordingly, in a case where the prediction mode IMP100 of the prediction set PS100 shown in (a) of FIG. 22 is caused to correspond to the prediction group G1, the prediction mode IMP100 is converted into a prediction mode representing the prediction group G1 when estimating a prediction mode.

However, this technique has a problem that a prediction mode corresponding to a prediction direction F1 shown in FIG. 23 is not derived as an estimated prediction mode.

This is specifically explained below with reference to FIG. 24. A prediction set PS400 shown in FIG. 24 includes eight kinds of directional predictions (prediction modes IMP400 to IMP407). As shown in FIG. 24, prediction directions of the prediction modes IMP400 to IMP406 of the prediction set are limited to a horizontal direction.

A prediction direction of a prediction mode of the IMP401 (indicated by a thick line in FIG. 24) included in the prediction set PS400 corresponds to a direction F1 shown in FIG. 23. That is, the prediction direction of the prediction mode IMP401 included in the prediction set PS400 does not correspond to any of the prediction directions of the prediction modes representing the prediction groups G1 to G8, respectively.

This raises a problem that in a case where the prediction set PS400 shown in FIG. 24 is a prediction set of a neighbor block, the prediction mode whose prediction direction is the direction F1 (prediction mode of the prediction mode IMP401 included in the prediction set PS400) cannot be used when estimating a prediction mode.

That is, the technique of Non-patent Literature 2 has a problem that the prediction mode derived as the estimated prediction mode is limited to the aforementioned representative prediction mode.

The present invention was made in view of the foregoing problem. An object of the present invention is to achieve a decoding device and a coding device each capable of improving accuracy in estimating a prediction mode in a case where applicable prediction modes are different between neighbor regions.

Solution to Problem

In order to solve the foregoing problem, a decoding device of the present invention is a decoding device for decoding coded image data based on an estimation of a prediction mode of a target region to be intra-frame predicted, which estimation is made based on one or more prediction modes of one or more neighbor regions which are neighboring to the target region, said decoding device including: estimated prediction mode deriving means for deriving an estimated prediction mode by estimating the prediction mode of the target region based on said one or more prediction modes of said one or more neighbor regions, said one or more prediction modes of said one or more neighbor regions being included in a sum of sets of prediction modes which are applicable to respective regions to be intra-frame predicted, the sum being identical to one of the sets of prediction modes.

Furthermore, in order to solve the foregoing problem, a coding device of the present invention is a coding device for coding image data based on an estimation of a prediction mode of a target region to be intra-frame predicted, which estimation is made based on one or more prediction modes of one or more neighbor regions which are neighboring to the target region, said coding device including: estimated prediction mode deriving means for deriving an estimated prediction mode by estimating the prediction mode of the target region based on said one or more prediction modes of said one or more neighbor regions, said one or more prediction modes of said one or more neighbor regions being included in a sum of sets of prediction modes which are applicable to respective regions to be intra-frame predicted, the sum being identical to one of the sets of prediction modes.

With the arrangement, the sum of sets of prediction modes which are applicable to respective regions to be intra-frame predicted is identical to one of the sets of prediction modes, and the estimated prediction mode is derived by estimating the prediction mode of the target region based on said one or more prediction modes, in the sum of sets, of said one or more neighbor regions.

With the arrangement, even when applicable prediction modes are different between regions, it is possible to use a prediction mode of a neighbor region in estimating a prediction mode of the target region. Accordingly, it is possible to avoid a situation, for example, that the prediction mode derived as the estimated prediction mode is limited to a representative of grouped prediction modes.

This allows yielding an effect of improving accuracy in estimating the prediction mode of the target region.

In order to solve the foregoing problem, a decoding device of the present invention is a decoding device for decoding coded image data based on an estimation of a prediction mode of a target region to be intra-frame predicted, which estimation is made based on a prediction mode of one or more neighbor regions which are neighboring to the target region, including: intermediate transform means for transforming said one or more prediction modes of said one or more neighbor regions into one or more intermediate prediction modes which is a prediction mode in an intermediate prediction set which is a sum of sets of prediction modes which are applicable to respective regions to be intra-frame predicted; and estimated prediction mode deriving means for deriving an estimated prediction mode by estimating the prediction mode of the target region based on said one or more intermediate prediction modes of said one or more neighbor regions which is obtained by the transform.

Furthermore, in order to solve the foregoing problem, a coding device of the present invention is a coding device for coding image data based on an estimation of a prediction mode of a target region to be intra-frame predicted, which estimation is made based on one or more prediction modes of one or more neighbor regions which are neighboring to the target region, including: intermediate transform means for transforming said one or more prediction modes of said one or more neighbor regions into one or more intermediate prediction modes which is a prediction mode in an intermediate prediction set which is a sum of sets of prediction modes which are applicable to respective regions to be intra-frame predicted; and estimated prediction mode deriving means for deriving an estimated prediction mode by estimating the prediction mode of the target region based on said one or more intermediate prediction modes of said one or more neighbor regions which is obtained by the transform.

With the arrangement, when the prediction mode of the target region is estimated, said one or more prediction modes of said one or more neighbor regions can be transformed into one or more intermediate prediction modes in an intermediate prediction set which is a sum of sets of prediction modes which are applicable to said one or more neighbor regions, and the prediction mode of the target region can be estimated based on the intermediate prediction mode obtained by the transform.

The intermediate prediction set includes all prediction modes applicable to said one or more neighbor regions. Timing for transforming the prediction mode of the neighbor region into the intermediate prediction mode of the neighbor region is not particularly limited. The transform may be made in advance when estimating the prediction mode of the neighbor region, or every time when estimating the prediction mode of the target region.

With the arrangement, even when applicable prediction modes are different between regions, it is possible to use a prediction mode of a neighbor region in estimating a prediction mode of the target region. Accordingly, it is possible to avoid a situation, for example, that the prediction mode derived as the estimated prediction mode is limited to a representative of grouped prediction modes.

This allows yielding an effect of improving accuracy in estimating the prediction mode of the target region.

Advantageous Effects of Invention

The decoding device of the present invention is a decoding device for decoding coded image data based on an estimation of a prediction mode of a target region to be intra-frame predicted, which estimation is made based on one or more prediction modes of one or more neighbor regions which are neighboring to the target region, said decoding device including: estimated prediction mode deriving means for deriving an estimated prediction mode by estimating the prediction mode of the target region based on said one or more prediction modes of said one or more neighbor regions, said one or more prediction modes of said one or more neighbor regions being included in a sum of sets of prediction modes which are applicable to respective regions to be intra-frame predicted, the sum being identical to one of the sets of prediction modes.

The coding device of the present invention is a coding device for coding image data based on an estimation of a prediction mode of a target region to be intra-frame predicted, which estimation is made based on one or more prediction modes of one or more neighbor regions which are neighboring to the target region, said coding device including: estimated prediction mode deriving means for deriving an estimated prediction mode by estimating the prediction mode of the target region based on said one or more prediction modes of said one or more neighbor regions, said one or more prediction modes of said one or more neighbor regions being included in a sum of sets of prediction modes which are applicable to respective regions to be intra-frame predicted, the sum being identical to one of the sets of prediction modes.

The decoding device of the present invention includes: intermediate transform means for transforming said one or more prediction modes of said one or more neighbor regions into one or more intermediate prediction modes which is a prediction mode in an intermediate prediction set which is a sum of sets of prediction modes which are applicable to respective regions to be intra-frame predicted; and estimated prediction mode deriving means for deriving an estimated prediction mode by estimating the prediction mode of the target region based on said one or more intermediate prediction modes of said one or more neighbor regions which is obtained by the transform.

The coding device of the present invention includes: intermediate transform means for transforming said one or more prediction modes of said one or more neighbor regions into one or more intermediate prediction modes which is a prediction mode in an intermediate prediction set which is a sum of sets of prediction modes which are applicable to respective regions to be intra-frame predicted; and estimated prediction mode deriving means for deriving an estimated prediction mode by estimating the prediction mode of the target region based on said one or more intermediate prediction modes of said one or more neighbor regions which is obtained by the transform.

This allows yielding an effect of improving accuracy in estimating the prediction mode of the target region.

BRIEF DESCRIPTION OF DRAWINGS

FIG. 6 is a view showing tables of prediction sets. (a) to (c) of FIG. 6 show tables of three kinds of prediction sets.

FIG. 10 is a view showing a table of the intermediate prediction set.

FIG. 16 is a table showing the content of a coding process carried out by a prediction mode coding section.

FIG. 21 is a view showing a case where an identifier for a prediction set is expressed as a vector.

DESCRIPTION OF EMBODIMENTS

The following description will describe an embodiment of the present invention with reference to FIGS. 1 through 21.

Figure 2:
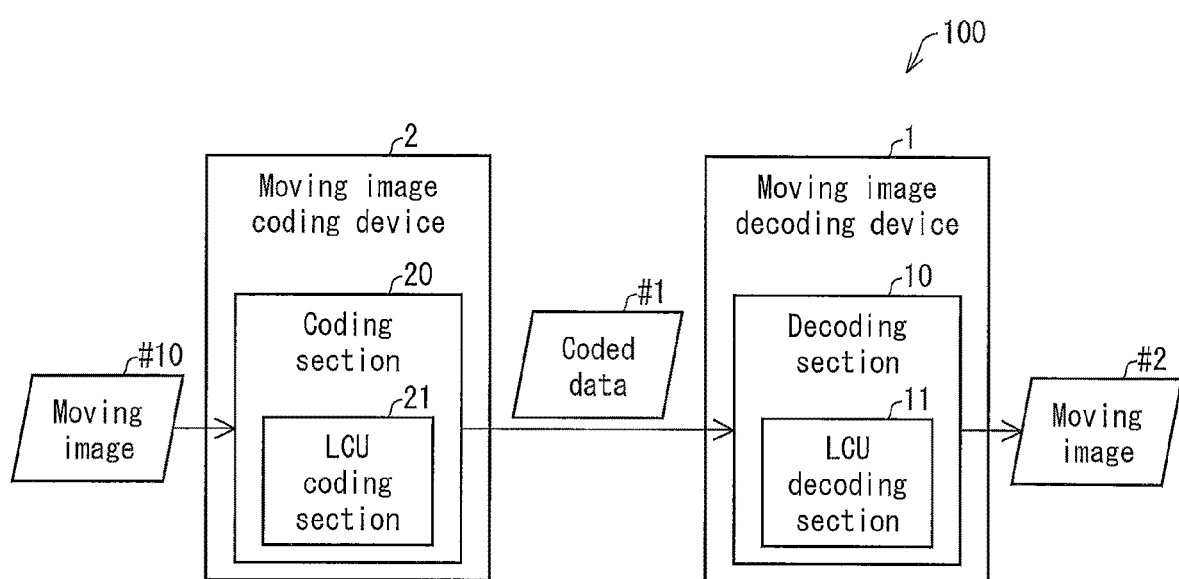
FIG. 2 is a block diagram schematically showing a configuration of a moving image coding system including a moving image encoder and a moving image decoder each in accordance with an embodiment of the present invention.

With reference to FIG. 2, a description will be first provided below as to outlines of a moving image encoder (coding device) 2 and a moving image decoder (decoding device) 1 in accordance with the present embodiment. FIG. 2 is a block diagram schematically showing a configuration of a moving image coding system 100 including the moving image encoder 2 and the moving image decoder 1.

The moving image encoder 2 and the moving image decoder 1 shown in FIG. 2 each include techniques employed in H. 264/MPEG-4 AVC and KTA software.

The moving image encoder 2 receives a moving image #10, and then a coding section 20 of the moving image #10 codes the moving image #10 so as to generate coded data #1. The moving image encoder 2 supplies the coded data #1 thus generated to the moving image decoder 1.

The moving image decoder 1 receives the coded data #1 from the moving image encoder 2, and then a decoding section 10 of the moving image decoder 1 decodes the coded data #1 so as to generate a moving image #2.

(Data Structure of Coded Data)

Figure 3:
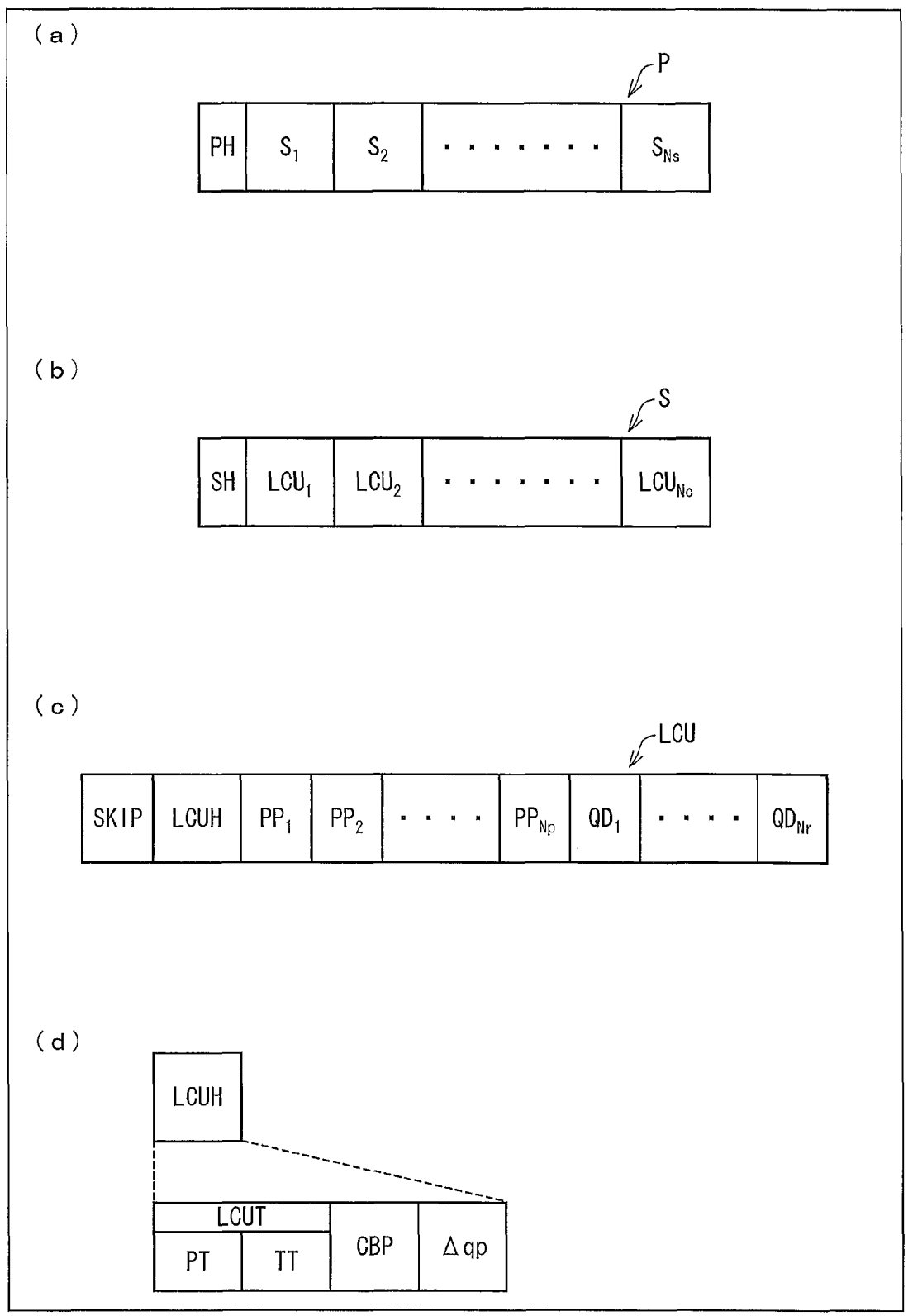
FIG. 3 is a view showing an example of a configuration of coded data generated by the moving image encoder and decoded by the moving image decoder. (a) shows a configuration of a picture layer of the coded data. (b) shows a configuration included in the picture layer. (c) shows a configuration of a LCU layer included in the slice layer. (d) shows a configuration of a LCU header included in a LCU.

With reference to FIG. 3, a description will be provided below as to a data structure of the coded data #1 which is generated by the moving image encoder 2 and is then decoded by the moving image decoder 1.

The coded data #1 has a hierarchical structure which is made up of a sequence layer, a GOP (Group of Pictures) layer, a picture layer, a slice layer, and an LCU (Largest Coding Unit) layer.

FIG. 3 shows structures of the picture layer and subsequent layers in the coded data #1. Specifically, (a) through (d) of FIG. 3 show structures of a picture layer P, a slice layer S, an LCU layer LCU, and an LCU header LCUH, respectively.

[Picture Layer]

The picture layer P is a set of data to which the moving image decoder 1 refers so as to decode a target picture. As shown in (a) of FIG. 3, the picture layer P contains a picture header PH and slice layers $S_1$ through $S_{Ns}$ (Ns indicates the total number of the slice layers contained in the picture layer P).

The picture header PH contains a coding parameter group to which the moving image decoder 1 refers so as to determine how to decode the target picture. For example, coding mode information (entoropy_coding_mode_flag) indicative of a mode of variable length coding employed by the moving image encoder 2 during coding is an example of coding parameters contained in the picture header PH.

[Slice Layer]

Each of the slice layers S contained in the picture layer P is a set of data to which the moving image decoder 1 refers so as to decode a target slice. As shown in (b) of FIG. 3, each slice layer S contains a slice header SH and LCU layers $LCU_1$ through $LCU_{Nc}$ (Nc indicates the total number of LCUs contained in the slice S).

The slice header SH contains a coding parameter group to which the moving image decoder 1 refers so as to determine how to decode the target slice. Examples of the coding parameters contained in the slice header SH include (1) slice-type designating information (slice_type) for designating a slice_type, (2) POC designating information (such as pic_order_cnt_lbs or delta_pic_order_cnt) for designating an order of displaying pictures (POC: Picture Order Count) containing target slices, and (3) weighting factor designating information (pred_weight_table) for designating a weighting factor employed by the moving image encoder 2 during coding. In a case where the moving image encoder 2 and the moving image decoder 1 each have an adaptive filter, the slice header SH contains a filter parameter FP employed in the adaptive filter.

Examples of the slice type which can be designated by the slice-type designating information include (1) an I slice using only an intra-prediction during coding, (2) a P slice using a unidirectional prediction or a bidirectional prediction during coding, and (3) a B slice using a unidirectional prediction, a bidirectional prediction, or an intra-prediction during coding.

[LCU Layer]

Each of the LCU layers LCU contained in the slice layer S is a set of data to which the moving image decoder 1 refers so as to decode a target LCU. Each LCU is quadtree-partitioned into a plurality of coding units (CU). Possible size of each CU is determined by size of an LCU and a maximum hierarchical depth that are contained in a sequence parameter set SPS of the coded data #1.

For example, in a case where the size of an LCU is 128×128 pixels and the maximum hierarchical depth is 5, a CU contained in the LCU can have one of five kinds of sizes, i.e. 128×128 pixels, 64×64 pixels, 32×32 pixels, 16×16 pixels, and 8×8 pixels.

[Prediction Unit (PU)]

Quadtree partition of a specific LCU is determined by a flag indicative of whether a CU of each layer is to be further quadtree-partitioned or not (split_coding_unit_flag). A CU corresponding to a leaf of quadtree partition (leaf of CU) is handled as a prediction unit (PU). A prediction type and splitting into partitions (PU Splitting) are determined for each PU, and a predicted image is generated for each partition. One of the intra-prediction and the inter-prediction is selectable as a prediction type. Splitting of each PU into partitions is determined in accordance with a prediction type selected for the PU. Hereinafter, a PU to which the intra-prediction is applied is also referred to as an intra-PU and a PU to which the inter-prediction is applied is also referred to as an inter-PU.

The intra-PU can be split into two kinds of partitions: 2N×2N pixels and N×N pixels. On the other hand, the inter-PU can be split into eight kinds of partitions in total according to (i) four symmetric splittings 2N×2N pixels, 2N×N pixels, N×2N pixels, and N×N pixels and (ii) four asymmetric splittings 2N×nU pixels, 2N×nD pixels, nL×2N pixels, and nR×2N pixels. A specific value of N is determined in accordance with the size of a CU to which the PU belongs, and specific values of nU, nD, NL, and nR are determined in accordance with the value of N.

For example, a CU of 128×128 pixels can be split into (i) intra-prediction partitions of 128×128 pixels and 64×64 pixels or (ii) inter-prediction partitions of 128×128 pixels, 128×64 pixels, 64×128 pixels, 64×64 pixels, 128×32 pixels, 128×96 pixels, 32×128 pixels, and 96×128 pixels.

[Transform Unit (TU)]

A leaf of a CU can be split into one or a plurality of transform units (TU). The transform unit refers to a unit for frequency transform (e.g. later-described DCT) and quantization. The leaf of a CU can be quadtree-partitioned into TUs. Information indicative of possible maximum size of a TU and possible maximum depth of a quadtree partition is contained in the coded data #1. Each TU can have a size ranging, for example, from 64×64 pixels to 2×2 pixels.

As shown in (c) of FIG. 3, each LCU layer LCU contains (1) a skip flag SKIP, (2) an LCU header LCUH, (3) prediction parameters $PP_1$ through $PP_{Np}$ assigned to respective partitions, and (4) quantization prediction errors $QD_1$ through $QD_{Nr}$ assigned to respective TUs. Here, Np indicates the total number of partitions contained in a target LCU, and Nr indicates the total number of TUs contained in the target LCU. In a case where the skip flag SKIP is 1, i.e. the target LCU is in a skip mode, (i) the LCU header LCUH, (ii) the prediction parameters $PP_1$ through $PP_{Np}$, and (iii) the quantization prediction errors $QD_1$ through $QD_{Nr}$ of the LCU layer are omitted.

[LCU Header]

The LCU header LCUH contains a coding parameter to which the moving image decoder 1 refers so as to determine how to decode a target LCU. Specifically, as shown in (d) of FIG. 3, the LCU header LCUH contains LCU-type designating information LCUT (mb_type) for designating the LCU type of the target LCU, CBP (coded_block_pattern) for designating a coded bock pattern, and a quantization parameter difference Δqp (mb_qp_delta) for designating the size of a quantization step. The LCU-type designating information LCUT contains prediction unit designating information PT and transform unit designating information TT.

The prediction unit designating information PT designates (i) a pattern of splitting of the target LCU into partitions (i.e. the sizes of respective partitions contained in the target LCU and their respective positions in the target LCU) and (ii) a prediction method (L0 unidirectional prediction, L1 unidirectional prediction, bidirectional prediction, intra-prediction etc.) employed when the moving image encoder 2 generates predicted images in respective partitions.

On the other hand, the transform unit designating information TT designates a pattern of splitting of the target LCU into TUs (i.e. the sizes of respective TUs contained in the target LCU and their respective positions in the target LCU). Hereinafter the TU may also be referred to as a block.

The quantization parameter difference Δqp is a difference (qp−qp') between a quantization parameter qp for the target LCU and a quantization parameter qp' for an LCU coded immediately before the target LCU.

[Quantization Prediction Residual and Prediction Parameter]

Each of quantization prediction residuals QDn contained in the LCU layer LCU is coded data generated by the moving image encoder 2 causing the target block to be subjected to the following Processes 1 through 3. In Process 1 a predicted image is subtracted from a coding target image so as to obtain a prediction residual, and then the prediction residual is subjected to DCT (Discrete Cosine Transform). In Process 2, the DCT coefficient obtained in Process 1 is quantized. In Process 3 the DCT coefficient quantized in the Process 2 is subjected to variable length coding. The aforementioned quantization parameter qp indicates the size of a quantization step QP used when the moving image encoder 2 quantizes the DCT coefficient ($QP=2^{qp/6}$).

The prediction parameters $PP_1$ through $PP_{Np}$ (hereinafter, referred to as merely prediction parameter PP unless it is necessary to distinguish the prediction parameters $PP_1$ through $PP_{Np}$) contained in the LCU layer LCU are classified into two kinds, i.e., (i) a prediction parameter relevant to an inter-prediction partition in which a predicted image is generated based on an inter-prediction and (ii) a prediction parameter relevant to an intra-prediction partition in which a predicted image is generated based on an intra-prediction.

Out of the prediction parameters PP, a description will be provided below as to the prediction parameter relevant to an intra-prediction partition in which a predicted image is generated based on an intra-prediction. Hereinafter a "prediction parameter PP" refers to a prediction parameter relevant to an intra-prediction partition in which a predicted image is generated based on an intra-prediction, unless otherwise stated. Note that a prediction mode employable in the intra-prediction will be later described in detail.

The prediction parameter PP contains a prediction index which is an index for designating an intra-prediction mode of a target partition. Note that the moving image encoder 2, which generates the coded data #1, can be arranged so that (i) an estimate of a prediction index for a target partition is calculated based on prediction indices for respective partitions neighboring the target partition and (ii) the coded data #1 contains a flag indicative of whether or not the estimate is equal to the prediction index of the target partition. This arrangement allows coding of the prediction index for the target partition to be omitted when the estimate is equal to the prediction index for the target partition.

Note that prediction set PS (detailed later) which is a set of prediction modes applicable to a target partition can be coded in the prediction parameter PP or in the LCU header LCUH. The prediction set PS can be selected from a predetermined plurality of prediction sets or a plurality of prediction sets transmitted in the picture header PH or the slice header SH, in accordance with the size of the target partition.

(Details of Moving Image Decoder)

Figure 4:
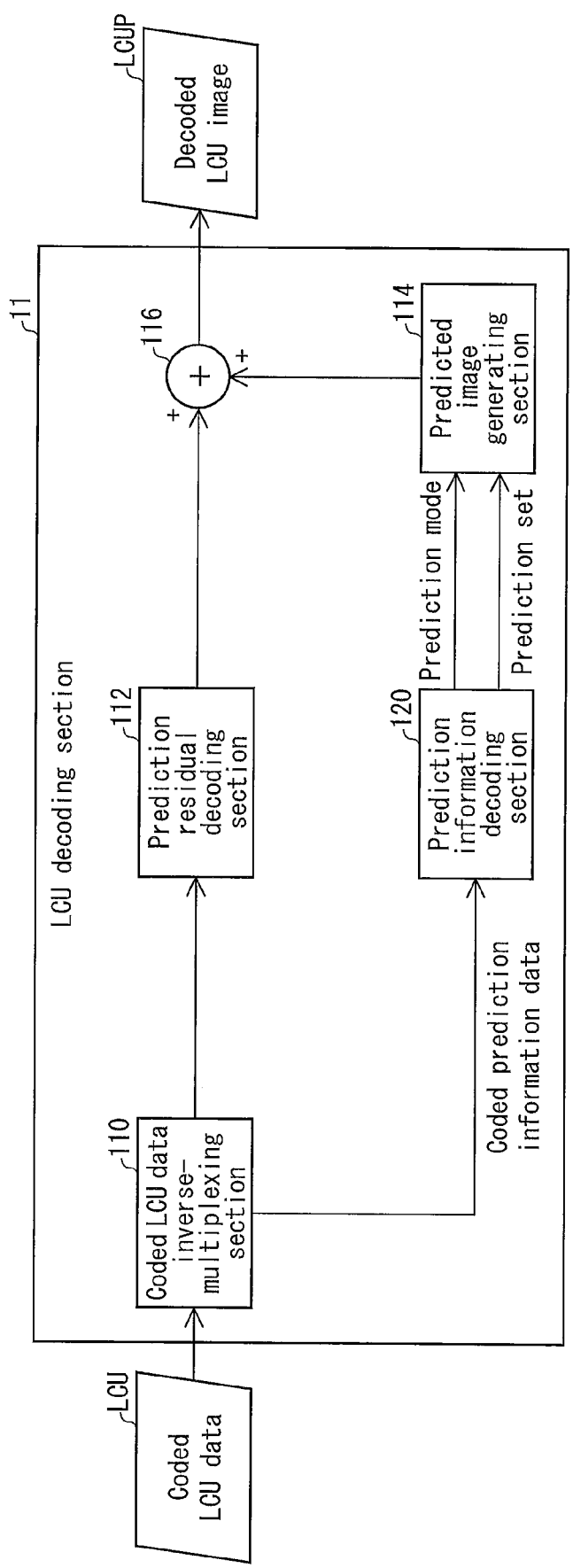
FIG. 4 is a functional block diagram schematically showing a configuration of a LCU decoding section of the moving image decoder.

The following description will discuss, with reference to FIGS. 2 and 4, a schematic configuration of the moving image decoder 1. As already described with reference to FIG. 2, the moving image decoder 1 includes the decoding section 10. As is clear from FIG. 2, the decoding section 10 includes an LCU decoding section 11 for decoding an image per LCU layer LCU.

For convenience, it is hereinafter assumed that the size of an LCU of an LCU layer is equal to that of a PU. Furthermore, it is hereinafter assumed that a PU is constituted by a single partition. Note, however, that the present embodiment is not limited to this, and a PU can therefore be constituted by two or more partitions.

The decoding section 10 supplies the coded data #1 per LCU to the LCU decoding section 11. Furthermore, the decoding section 10 obtains a decoded LCU image which has been decoded per LCU by the LCU decoding section 11, generates a moving image #2, and outputs the moving image #2 thus generated.

With reference to FIG. 4, a configuration of the LCU decoding section 11 will be described below in detail. As shown in FIG. 4, the LCU decoding section 11 includes a coded LCU data inverse-multiplexing section 110, a prediction residual decoding section 112, a predicted image generating section 114, an adder 116, and a prediction information decoding section 120.

The coded LCU data inverse-multiplexing section 110 inverse-multiplexes (i) coded quantization prediction residual data QD and (ii) coded prediction information data PD which have been multiplexed in coded LCU data LCU supplied from the decoding section 10. The coded prediction information data PD is data which contains a prediction mode m of and a prediction set PS of a target partition. The prediction set PS will be later described in detail. The coded LCU data inverse-multiplexing section 110 supplies (i) the coded quantization prediction residual data QD, which has been inverse-multiplexed, to the prediction residual decoding section 112 and (ii) the coded prediction information data PD, which has been inverse-multiplexed, to the prediction information decoding section 120.

For each transform unit designated by the transform unit designating information TT, the prediction residual decoding section 112 (i) decodes the coded quantization prediction residual data QD, (ii) generates a prediction residual, and (iii) supplies the generated prediction residual to the adder 116.

The following description will discuss in more detail the process of decoding the prediction residual by the prediction residual decoding section 112. The prediction residual decoding section 112 inverse-quantizes the coded quantization prediction residual data QD by (i) inverse-quantizing with the use of the quantization step QP and (ii) carrying out an inverse DCT (Discrete Cosine Transform) with respect to a DCT coefficient obtained by the inverse-quantization, thereby decoding the prediction residual.

While inverse-quantizing of the quantization prediction residual QD, the prediction residual decoding section 112 derives a quantization step QP from the quantization parameter difference Δqp contained in the LCU header LCUH of the coded LCU data LCU. The quantization parameter qp can be derived by adding the quantization parameter difference Δqp to a quantization parameter qp' relevant to a TU which has been most recently subjected to inverse quantization/inverse DCT. The quantization step QP can be derived by substituting the quantization step qp for $QP=2^{qp/6}$.

The prediction information decoding section 120 decodes the coded prediction information data PD supplied from the coded LCU data inverse-multiplexing section 110 so as to generate a prediction mode m and a prediction set PS, and then supplies the prediction mode m and the prediction set PS to the predicted image generating section 114. The prediction information decoding section 120 will be later described in detail.

For each partition designated by the prediction unit designating information PT, the predicted image generating section 114 generates a predicted image Pred based on an intra-prediction while using the prediction mode m and the prediction set PS supplied from the prediction information decoding section 120. Note that a description will be provided below as to a process of generating the predicted image Pred based on the intra-prediction. The present embodiment is, however, not limited to such. Alternatively, the predicted image generating section 114 can generate a predicted image Pred based on an inter-prediction. Note that, although the intra-prediction is sometimes referred to as intra-frame prediction or spatial prediction, these expressions are hereinafter unified into intra-prediction.

The adder 116 generates a decoded LCU image LCUP by adding the prediction residual supplied from the prediction residual decoding section 112 to the predicted image Pred supplied from the predicted image generating section 114.

(Prediction Set)

Prior to describing in detail the prediction information decoding section 120, a prediction set will be described below with reference to FIGS. 5 through 7.

Figure 5:
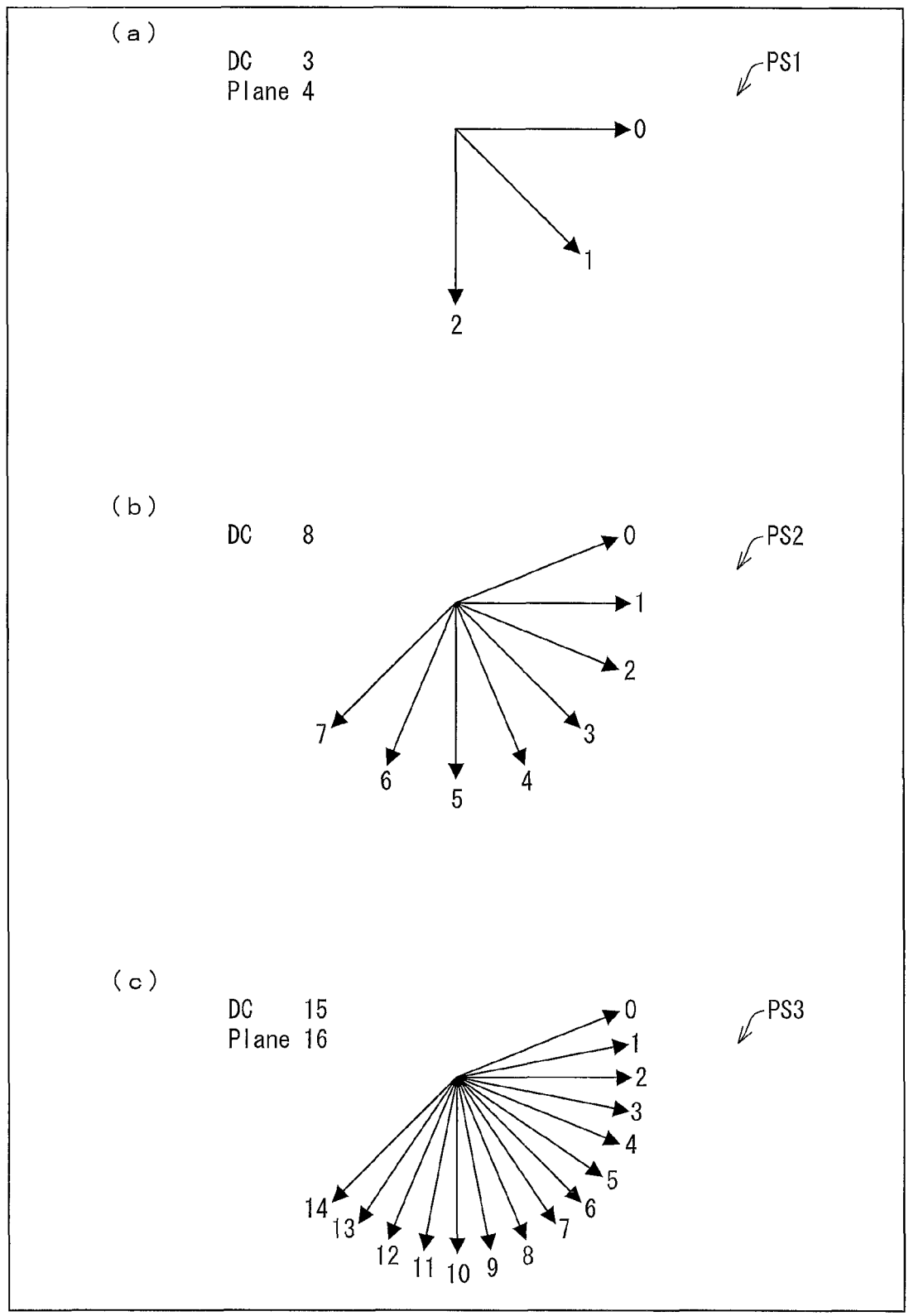
FIG. 5 is a view exemplifying prediction sets. (a) to (c) of FIG. 5 show three kinds of prediction sets, respectively.

With reference to FIG. 5, an example of the prediction set will be described below. (a) through (c) of FIG. 5 exemplify three kinds of prediction sets, respectively.

Applicable prediction modes are different depending on properties of a partition and the size of the partition. (a) through (c) of FIG. 5 exemplify a prediction set PS1 indicative of a prediction mode applicable to a 4×4 sized partition, a prediction set PS2 indicative of a prediction mode applicable to a 8×8 sized partition, and a prediction set PS3 indicative of a prediction mode applicable to a 32×32 (or 16×16) sized partition, respectively. Numbers shown in (a) through (c) of FIG. 5 indicate prediction indices, i.e. IDs of respective prediction modes. Arrows shown in (a) to (c) of FIG. 5 indicate prediction directions of respective directional predictions.

As shown in (a) of FIG. 5, the prediction set PS1 contains three kinds of directional predictions (ID: 0-2), a DC prediction (ID: 3), and a plane prediction (ID: 4).

As shown in (b) of FIG. 5, the prediction set PS2 includes eight kinds of directional predictions (ID: 0-7) and a DC prediction (ID: 8).

As shown in (c) of FIG. 5, the prediction set PS3 includes fifteen kinds of directional predictions (ID: 0-14), a DC prediction (ID: 15), and a plane prediction (ID: 16).

The prediction set PS1 shown in (a) of FIG. 5, the prediction set PS2 shown in (b) of FIG. 5, and the prediction set PS3 shown in (c) of FIG. 5 are expressed in the form of tables as shown in (a), (b), and (c) of FIG. 6, respectively. Each table contains items of IDs and prediction modes. "IDs" indicate prediction indices assigned to respective prediction modes contained in the prediction set. "Prediction modes" indicate names of respective prediction modes.

In FIG. 6, a directional prediction is indicated by "angle (θ)". A corresponding angle is designated as "θ". As shown in FIG. 7, θ is defined as an angle between a prediction direction Dir and an X-axis.

In FIG. 6, DC prediction is indicated by "DC" and plane prediction is indicated by "Plane".

As described above, even in a case where prediction modes are identical to each other, prediction indices assigned to respective prediction modes are different from prediction set to prediction set. For example, the prediction sets PS1, PS2, and PS3 contain respective DC predictions, but prediction indices assigned to the respective DC predictions are different. Namely, ID: 3, ID: 8, and ID: 15 are assigned to the prediction sets PS1, PS2, and PS3, respectively.

(Detail of Prediction Information Decoding Section)

Figure 1:
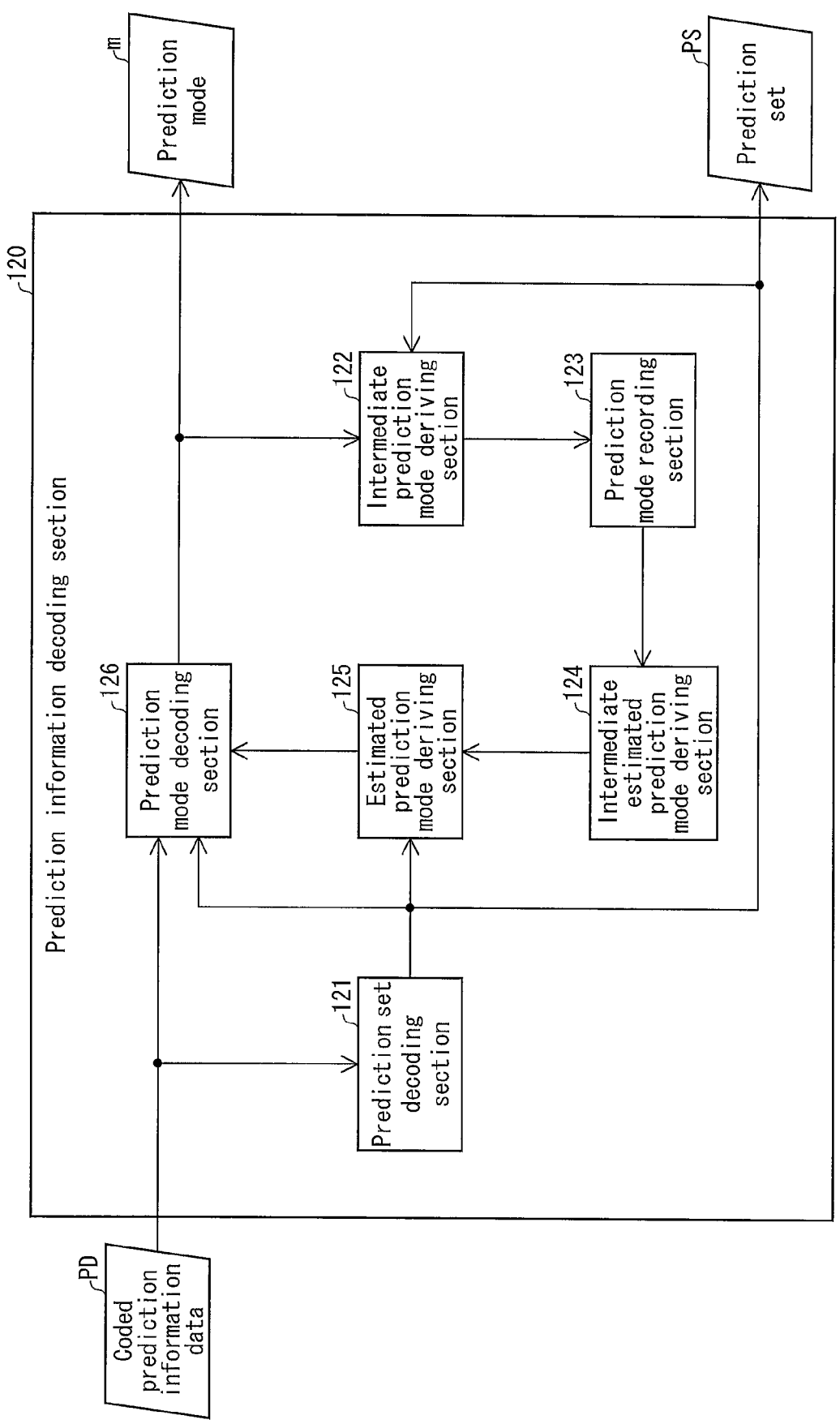
FIG. 1 is a functional block diagram schematically showing a configuration of a prediction information decoding section of a moving image decoder in accordance with an embodiment of the present invention.

The following description will discuss in detail, with reference to FIG. 1, the prediction information decoding section 120. FIG. 1 is a functional block diagram schematically showing a configuration of the prediction information decoding section 120.

As shown in FIG. 1, the prediction information decoding section 120 includes a prediction set decoding section 121, an intermediate prediction mode deriving section 122, a prediction mode recording section 123, an intermediate estimated prediction mode deriving section (intermediate transform means) 124, an estimated prediction mode deriving section (estimated prediction mode deriving means) 125, and a prediction mode decoding section 126.

[Prediction Set Decoding Section]

The prediction set decoding section 121 decodes, from the coded prediction information data PD, a prediction set indicative of the kind of a prediction mode applicable to a partition to be predicted.

[Intermediate Prediction Mode Deriving Section]

The intermediate prediction mode deriving section 122 derives an intermediate prediction mode that is obtained by converting the prediction mode supplied from the prediction mode decoding section 126 into a prediction mode of an intermediate prediction set. In other words, the intermediate prediction mode deriving section 122 maps, on an intermediate prediction mode of an intermediate prediction set, the prediction mode contained in the prediction set for the target partition.

To be specific, the intermediate prediction mode deriving section 122 generates an intermediate prediction set which is a sum of prediction sets for individual partitions, and carries out a transform process (mapping process) by using the generated intermediate prediction set.

Figures 7, 8:
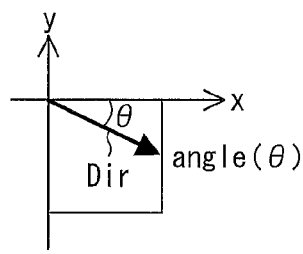
FIG. 7 is a view showing an angular parameter (θ) for directional prediction.
FIG. 8 is a view showing examples of correspondence tables. (a) to (c) of FIG. 8 show correspondence tables corresponding to the three kinds of prediction sets, respectively.
Figure 9:
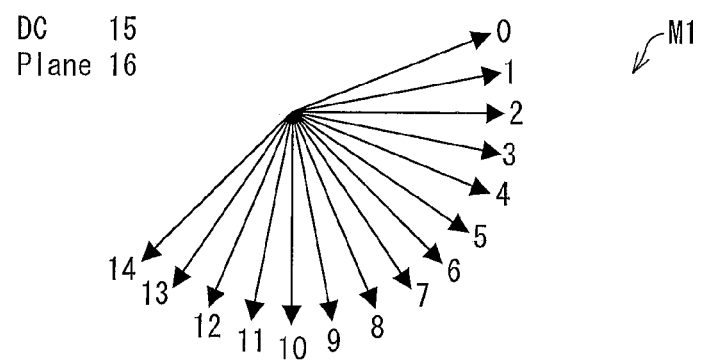
FIG. 9 is a view showing an example of an intermediate prediction set generated from the three kinds of prediction sets.

The following description will discuss, with reference to FIGS. 8 and 9, (i) the intermediate prediction set generated by the intermediate prediction mode deriving section 122 and (ii) the mapping process on the intermediate prediction set. The following description will focus on a case where an intermediate prediction set M1 is generated from the prediction sets PS1 through PS3 shown in FIG. 5.

Initially, the intermediate prediction mode deriving section 122 specifies a prediction mode of the same kind out of the prediction sets PS1 through PS3. Then, the intermediate prediction mode deriving section 122 assigns the same intermediate prediction mode ID to the prediction mode of the same kind out of the prediction sets PS1 through PS3, whereas assigns different intermediate prediction mode IDs to different prediction modes. This causes, with respect to the prediction sets PS1 thorough PS3, respective correspondence tables TBL1 through TBL3 each indicative of a correspondence between respective IDs of prediction modes in the prediction set and respective assigned IDs.

FIG. 8 shows example correspondence tables. (a) of FIG. 8 shows an example correspondence table TBL1 indicative of a correspondence between respective prediction mode IDs of 0 to 4 in the prediction set PS1 and respective intermediate prediction mode IDs.

(b) of FIG. 8 shows an example correspondence table TBL2 indicative of a correspondence between respective prediction mode IDs of 0 to 8 in the prediction set PS2 and respective assigned intermediate prediction mode IDs. (c) of FIG. 8 shows an example correspondence table TBL3 indicative of a correspondence between prediction mode IDs of 0 to 16 in the prediction set PS3 and respective intermediate prediction mode IDs.

The prediction mode ID and the intermediate prediction mode ID, each being designated as k in the correspondence table TBL3 shown in (c) of FIG. 8, indicates that the prediction mode ID is equal to the intermediate prediction mode ID. In other words, being designated as "k" indicates that a prediction mode in the prediction set PS3 is equal to a prediction mode in the intermediate prediction set M1.

The intermediate prediction mode deriving section 122 generates the intermediate prediction set M1 by carrying out a correspondence between the respective intermediate prediction mode IDs assigned as above and the respective prediction modes. FIG. 9 illustrates an example intermediate prediction set M1 which the intermediate prediction mode deriving section 122 generates with use of the prediction sets PS1 through PS3. As shown in FIG. 9, the intermediate prediction set M1 contains fifteen kinds of directional predictions (ID: 0-14), DC prediction (ID: 15), and plane prediction (ID: 16).

FIG. 10 shows an example in which the intermediate prediction set M1, generated by the intermediate prediction mode deriving section 122, is expressed in the form of a table.

As shown in FIG. 10, the intermediate prediction set M1 contains items of IDs and intermediate prediction modes. The IDs are assigned by the intermediate prediction mode deriving section 122 to respective prediction modes in a case where the intermediate prediction mode deriving section 122 generates the correspondence tables TBL1 through TBL3 and the intermediate prediction set M1. As shown in FIGS. 8 and 9, the intermediate prediction set M1 is equal to the prediction set PS3.

The intermediate prediction mode deriving section 122 converts the prediction mode supplied from the prediction mode decoding section 126 into an intermediate prediction mode with use of the intermediate prediction set M1 as mentioned above, and then supplies the intermediate prediction mode to the prediction mode recording section 123.

[Prediction Mode Recording Section]

The prediction mode recording section 123 records the intermediate prediction mode, of the target partition, which has been derived by the intermediate prediction mode deriving section 122.

[Intermediate Estimated Prediction Mode Deriving Section]

Based on intermediate prediction modes of partitions neighboring to the target partition which are recorded in the prediction mode recording section 123, the intermediate estimated prediction mode deriving section 124 derives an intermediate estimated prediction mode which is an intermediately estimated prediction mode of the target prediction. The intermediate estimated prediction mode deriving section 124 supplies the intermediate estimated prediction mode thus derived to the estimated prediction mode deriving section 125.

Herein, the reason why the expression "intermediately estimated" is used is that the prediction mode predicted based on the neighbor partitions is sometimes not a prediction mode applicable to the target partition because applicable prediction mode varies from partition to partition. It is the estimated prediction mode deriving section 125 (mentioned later) that finally derives an estimated prediction mode.

Figures 11, 12:
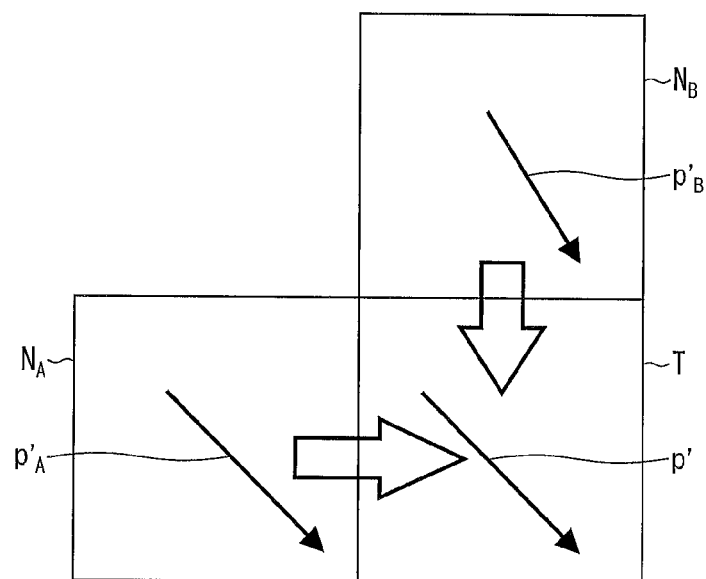
FIG. 11 is a view showing how to derive an intermediate estimated prediction mode.
FIG. 12 is a table showing the content of a decoding process carried out by a prediction mode decoding section.

With reference to FIG. 11, the following description will discuss more specifically how the intermediate estimated prediction mode deriving section 124 derives an intermediate estimated prediction mode.

As is illustrated in FIG. 11, neighbor partitions of a target partition T refer to a left-hand neighbor partition $N_A$ of the target partition T and an upper neighbor partition $N_B$ of the target partition T. In FIG. 11, an intermediate prediction mode p'A indicates an intermediate prediction mode of the left-hand neighbor partition $N_A$, and an intermediate prediction mode p'B indicates an intermediate prediction mode of the upper-neighbor partition $N_B$. For convenience, the intermediate prediction modes p'A and p'B are assumed to modes of directional prediction, and their prediction directions are indicated by arrows.

The intermediate estimated prediction mode deriving section 124 derives, as an intermediate estimated prediction mode of the target partition, the intermediate prediction mode of the left-hand neighbor partition or the intermediate prediction mode of the upper neighbor partition, whichever has higher occurrence frequency (occurrence probability).

To be more specific, how the intermediate estimated prediction mode deriving section 124 derives an intermediate estimated prediction mode p' is represented by Formula (1) below.

[Mathematical Formula 1]

$$p' = \underset{p'_x \in P_N}{\mathrm{argmin}}\{rankorder(p'_x)\} \qquad (1)$$

In Formula (1), $P_N$ represents a set of intermediate prediction modes of respective partitions neighboring to the target partition T. That is, $P_N = \{p'_A, p'_B\}$.

Namely, p'x is an intermediate prediction mode of a neighbor partition Nx, and x is A or B.

The rankorder function is a function that returns an rank order of p'x in a rank order list in which prediction modes contained in the intermediate prediction set are arranged in the order of occurrence frequency. The rankorder function returns a smaller rank order as the occurrence frequency is higher whereas returns a larger rank order as the occurrence frequency is lower.

The min function is a function that returns a minimum value of an argument. The arg function is a function that returns, in a case where a rank order of the rank order list is designated, an intermediate prediction mode of a designated rank order.

That is, the calculation below is made in the formula (1). The rankorder function first returns the rank order of occurrence frequency of an intermediate prediction mode of each of the left-hand neighbor partition $N_A$ and the upper neighbor partition $N_B$. Subsequently, the min function returns a smaller one of the rank order of the intermediate prediction mode p'A of the left-hand neighbor partition $N_A$ and the rank order of the intermediate prediction mode p' B for the upper neighbor partition $N_B$. Then, the arg function derives, as the intermediate estimated prediction mode p', an intermediate prediction mode of the rank order returned from the min function. In other words, Formula (1) allows for selection of an intermediate prediction mode with the highest occurrence frequency from intermediate prediction modes of respective plural neighbor partitions.

Note that the rank order list used by the rankorder function to return rank orders can be generated based on prior checking of intermediate prediction modes of the neighbor partitions.

Note also that the rank order list can be shared beforehand between the moving image encoder 2 and the moving image decoder 1 as in the case of H. 264/AVC. For example, a configuration can be employed in which (i) the moving image encoder 2 and the moving image decoder 1 each include a rank order list recording section (not shown) for recording the rank order list and (ii) the rankorder function can refer to the rank order list recorded in the rank order list recording section.

Alternatively, another configuration can be employed in which (i) the moving image encoder 2 encodes occurrence frequencies of respective intermediate prediction modes and transmits, as coded data, the encoded occurrence frequencies to the moving image decoder 1 and (ii) the moving image decoder 1 uses the transmitted occurrence frequencies as the rank order list. In other words, the moving image decoder 1 can be configured so as to have a rank order list acquiring section (acquiring means) for acquiring the rank order list contained in the coded data #1 supplied from the moving image encoder 2.

Information indicative of the occurrence frequencies can be appropriately updated based on statistical information on previously decoded prediction modes. For example, occurrence frequencies of intermediate prediction modes of pictures which were decoded earlier than the target picture can be used in a target frame. Alternatively, occurrence frequencies of intermediate prediction modes of partitions which are contained in the same slice as the target partition is contained and which are decoded before the target partition can be used.

[Estimated Prediction Mode Deriving Section]

The estimated prediction mode deriving section 125 derives an estimated prediction mode from the intermediate estimated prediction mode p' which is derived by the intermediate estimated prediction mode deriving section 124, and then supplies the estimated prediction mode thus derived to the prediction mode decoding section 126.

Specifically, in a case where the intermediate estimated prediction mode p' is contained in a prediction set of the target partition, the estimated prediction mode deriving section 125 derives the intermediate estimated prediction mode p' as an estimated prediction mode. In other words, in a case where the intermediate estimated prediction mode p' is a prediction mode applicable to the target partition, the estimated prediction mode deriving section 125 derives, as an estimated prediction mode, the intermediate estimated prediction mode p' as it is.

In contrast, in a case where the intermediate estimated prediction mode p' is not contained in the prediction set of the target partition, the estimated prediction mode deriving section 125 derives, as an estimated prediction mode, a prediction mode which is contained in the prediction set of the target partition and which has properties similar to those of the intermediate estimated prediction mode p'.

In other words, in the case where the intermediate estimated prediction mode p' is not contained in the prediction set of the target partition, the estimated prediction mode deriving section 125 transforms, in accordance with a predetermined rule, the intermediate estimated prediction mode p' into a prediction mode contained in the prediction set of the target partition. Such a rule can be stored in the moving image decoder 1 as a transform table in which intermediate estimated prediction modes that have not been transformed are correlated to estimated prediction modes that have been transformed.

The estimated prediction mode deriving section 125 determines, in accordance with the following rule, whether or not a certain prediction mode has properties similar to those of another prediction mode.

In a case where a certain prediction mode is a directional prediction, the estimated prediction mode deriving section 125 first determines whether or not an angle between (i) a prediction direction of the certain prediction mode and (ii) a prediction direction of the another prediction mode is within a predetermined range.

In a case where the angle is within the predetermined range, the estimated prediction mode deriving section 125 determines that the certain prediction mode has properties similar to those of the another prediction mode. In a case where there are a plurality of prediction modes which meet the rule, the estimated prediction mode deriving section 125 gives preference, over the other prediction mode(s), to a prediction mode whose prediction direction is closer to a horizontal direction or vertical direction.

In a case where a certain prediction mode is a planar prediction (DC or Plane), the estimated prediction mode deriving section 125 gives preference to a prediction mode with the highest occurrence probability over the other prediction mode(s).

[Prediction Mode Decoding Section]

The prediction mode decoding section 126 decodes the prediction mode m, based on the prediction set PS and the estimated prediction mode which is supplied from the estimated prediction mode deriving section 125.

With reference to FIG. 12, the following description will discuss more specifically the decoding process carried out by the prediction mode decoding section 126. FIG. 12 is a table showing the content of the decoding process carried out by the prediction mode decoding section 126.

FIG. 12 is a table showing the content of the decoding process carried out by the prediction mode decoding section 126. In FIG. 12, m indicates a prediction mode of the target partition and p indicates an estimated prediction mode.

Decimal(x, n) is a function for converting a string of n bits into a decimal number. n is a value derived from n=ceil $(\log_2(a-1))$. a is the number of a prediction mode contained in a prediction set, and ceil function is a function that returns the number obtained by rounding up the decimal fraction of an argument.

As shown in FIG. 12, the prediction mode decoding section 126 carries out the decoding process in accordance with settings of flag_bit and rem_bits which are encoded in coded data.

The flag_bit is a flag indicative of whether or not a prediction mode predicted based on neighbor blocks is equal to a prediction mode of the target partition. The rem_bits is information indicating which prediction mode is actually the prediction mode of the target partition in a case where the prediction mode, which is predicted based on the neighbor blocks, is different from the prediction mode of the target partition.

The prediction mode decoding section 126 sets m in accordance with the set value of the flag_bit. In a case where the flag_bit is set to "1", the prediction mode decoding section 126 sets m to p.

In a case where the flag_bit is set to "0", the prediction mode decoding section 126 acquires "k" to which the rem_bits is set, and then determines whether or not the decimal(k, n) is smaller than p.

In a case where the decimal(k, n) is smaller than p ("decimal(d, n)<p" is true), the prediction mode decoding section 126 sets m to the decimal(k, n). On the other hand, in a case where the decimal(k, n) is not smaller than p ("decimal(d, n)<p" is false), the prediction mode decoding section 126 sets m to the decimal(k, n)+1.

The value of the prediction mode decoded based on the above procedure is one of Nm integers which fall within a range of [0, Nm−1] where Nm is the number of prediction modes contained in the prediction set PS. In general, in order that a prediction mode value is expressed with fewer codes, the range of possible values of the prediction mode is limited so as to meet the above condition. In that case, the intermediate prediction mode deriving section 122 carries out a process of converting an integer, which falls within the range of [0, Nm−1], into an intermediate prediction mode. In contrast, the estimated prediction mode deriving section 125 carries out a process of converting an intermediate prediction mode into an integer which falls within the range of [0, Nm−1].

(Flow of Process)

Figure 13:
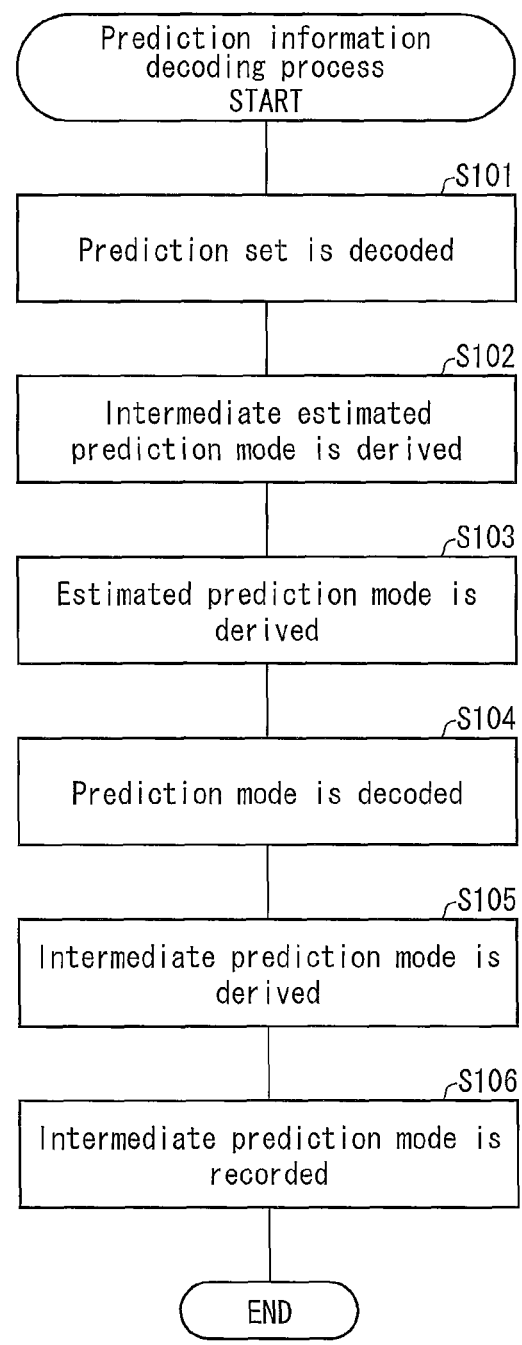
FIG. 13 is a flowchart showing the flow of a prediction information decoding process carried out in the moving image decoder.

Here, with reference to FIG. 13, a description will be provided below as to a flow of a prediction information decoding process carried out by the prediction information decoding section 120 of the moving image decoder 1. FIG. 13 is a flowchart showing the flow of the prediction information decoding process carried out in the moving image decoder 1.

In response to the prediction information decoding section 120 acquiring coded prediction information data PD, the process is initiated and the prediction set decoding section 121 decodes a prediction set (S101).

Subsequently, the intermediate estimated prediction mode deriving section 124 derives an intermediate estimated prediction mode of the target partition by using intermediate prediction modes of partitions neighboring to the target partition which modes are recorded in the prediction mode recording section 123 (S102).

Next, the estimated prediction mode deriving section 125 derives, from the intermediate estimated prediction mode derived by the intermediate estimated prediction mode deriving section 124, an estimated prediction mode in accordance with the prediction set of the target partition (S103).

Then, the prediction mode decoding section 126 decodes the prediction mode of the target partition by using the prediction set decoded by the prediction set decoding section 121 and flag_bit and rem_bits which are contained in the coded prediction information data PD (S104).

Here, the intermediate prediction mode deriving section 122 derives the intermediate prediction mode of the target partition by using the intermediate prediction set, the decoded prediction mode and the decoded prediction set (S105), and the prediction mode recording section 123 records the intermediate prediction mode derived by the intermediate prediction mode deriving section 122 (S106). The intermediate prediction mode of the target partition which is recorded in the prediction mode recording section 123 is used when the target partition is referred to as a partition neighboring to a target partition to be predicted later.

As a result of the prediction information decoding process from S101 to S106, the prediction information decoding section 120 outputs the prediction mode m and the prediction set PS, and the process is finished.

(Operation and Effect)

As described above, the moving image decoder 1 is a moving image decoder for decoding coded image data #1 based on an estimation of a prediction mode of a target partition T to be intra-predicted which estimation is made based on prediction modes of neighbor partitions $N_A$ and $N_B$ of the target partition T, and includes (i) the intermediate estimated prediction mode deriving section 124 for transforming the prediction modes of the neighbor partitions $N_A$ and $N_B$ into intermediate prediction modes contained in an intermediate prediction set M1 which is a sum of prediction sets PS and (ii) the estimated prediction mode deriving section 125 for deriving an estimated prediction mode p' by estimating the prediction mode of the target partition T based on prediction modes p'A and p'B of the respective neighbor partitions $N_A$ and $N_B$ which are obtained by the transform.

With the arrangement, it is possible to yield an effect of improving accuracy in estimating the prediction mode of the target partition.

(Detail of Moving Image Encoder)

Figure 14:
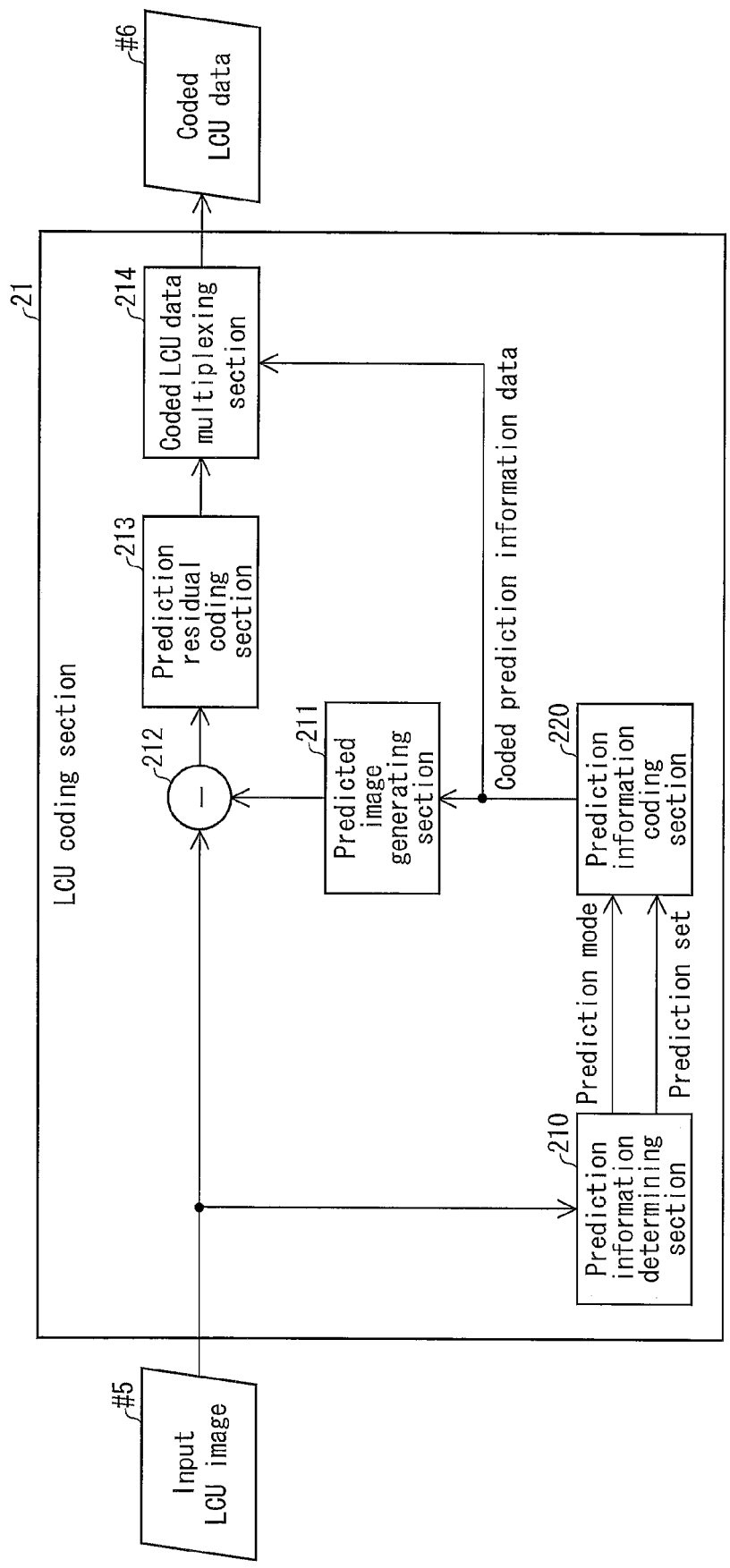
FIG. 14 is a functional block diagram schematically showing a LCU coding section of the moving image encoder.

With reference to FIGS. 2 and 14, a description will be provided as to a schematic configuration of a moving image encoder. As already described with reference to FIG. 2, the moving image encoder 2 includes the coding section 20. To be more specific with reference to FIG. 2, the coding section 20 further includes an LCU coding section 21 for coding an image per LCU layer LCU.

The coding section 20 divides a moving image #10 into a plurality of LCUs. Then, the coding section 20 supplies, to the LCU coding section 21, an input LCU image #5 (see FIG. 14) obtained as a result of dividing the moving image #10. The coding section 20 determines a prediction unit (PU) and a transform unit (TU) based on a dividing unit for the moving image #10, and designates the prediction unit (PU) and the transform unit (TU) as prediction unit designating information PT and transform unit designating information TT, respectively.

Note that in the following description, similarly with the case of the moving image decoder 1, it is assumed that the size of an LCU of an LCU layer is equal to that of a PU. It is further assumed that a PU is constituted by a single partition. Note however that the present embodiment is not limited to this, and a PU can therefore be constituted by two or more partitions.

Furthermore, the coding section 20 acquires coded LCU data #6 from the LCU coding section 21 so as to generate coded data #1, and supplies the coded data #1 thus generated to the moving image decoder 1.

With reference to FIG. 14, the following description will discuss in detail a configuration of the LCU coding section 21. As shown in FIG. 14, the LCU coding section 21 includes a prediction information determining section 210, a predicted image generating section 211, a subtractor 212, a prediction residual coding section 213, a coded LCU data multiplexing section 214, and a prediction information coding section 220.

The prediction information determining section 210 determines a prediction mode and a prediction set in accordance with the size of a partition designated with respect to the input LCU image #5, and then supplies, to the prediction information coding section 220, a determined prediction mode and a determined prediction set.

The prediction information coding section 220 codes the prediction mode and the prediction set, which are supplied from the prediction information determining section 210, so as to generate coded prediction information data PD. The prediction information coding section 220 supplies the coded prediction information data PD thus generated to the predicted image generating section 211 and the coded LCU data multiplexing section 214. The prediction information coding section 220 will be later described in detail.

The predicted image generating section 211 generates a predicted image by using the coded prediction information data PD supplied from the prediction information coding section 220, and then supplies the predicted image to the subtractor 212.

The subtractor 212 generates a prediction residual by subtracting the predicted image from the input LCU image, and then supplies the prediction residual to the prediction residual coding section 213.

For each transform unit designated by the transform unit designating information TT, the prediction residual coding section 213 codes the prediction residual supplied from the subtractor 212, and then supplies, as quantized prediction residual coded data, the coded prediction residual to the coded LCU data multiplexing section 214.

To be more specific, the process of coding the prediction residual by the prediction residual coding section 213 is carried out as follows. The prediction residual coding section 213 carries out DCT (Discrete Cosine Transform) with respect to the prediction residual for each transform unit (block) so as to obtain a DCT coefficient, and then quantizes the DCT coefficient so as to code the prediction residual.

The coded LCU data multiplexing section 214 multiplexes (i) the quantized prediction residual coded data supplied from the prediction residual coding section 213 and (ii) the prediction information coding data PD supplied from the prediction information coding section 220 so as to generate coded LCU data #6.

(Detail of Prediction Information Coding Section)

Figure 15:
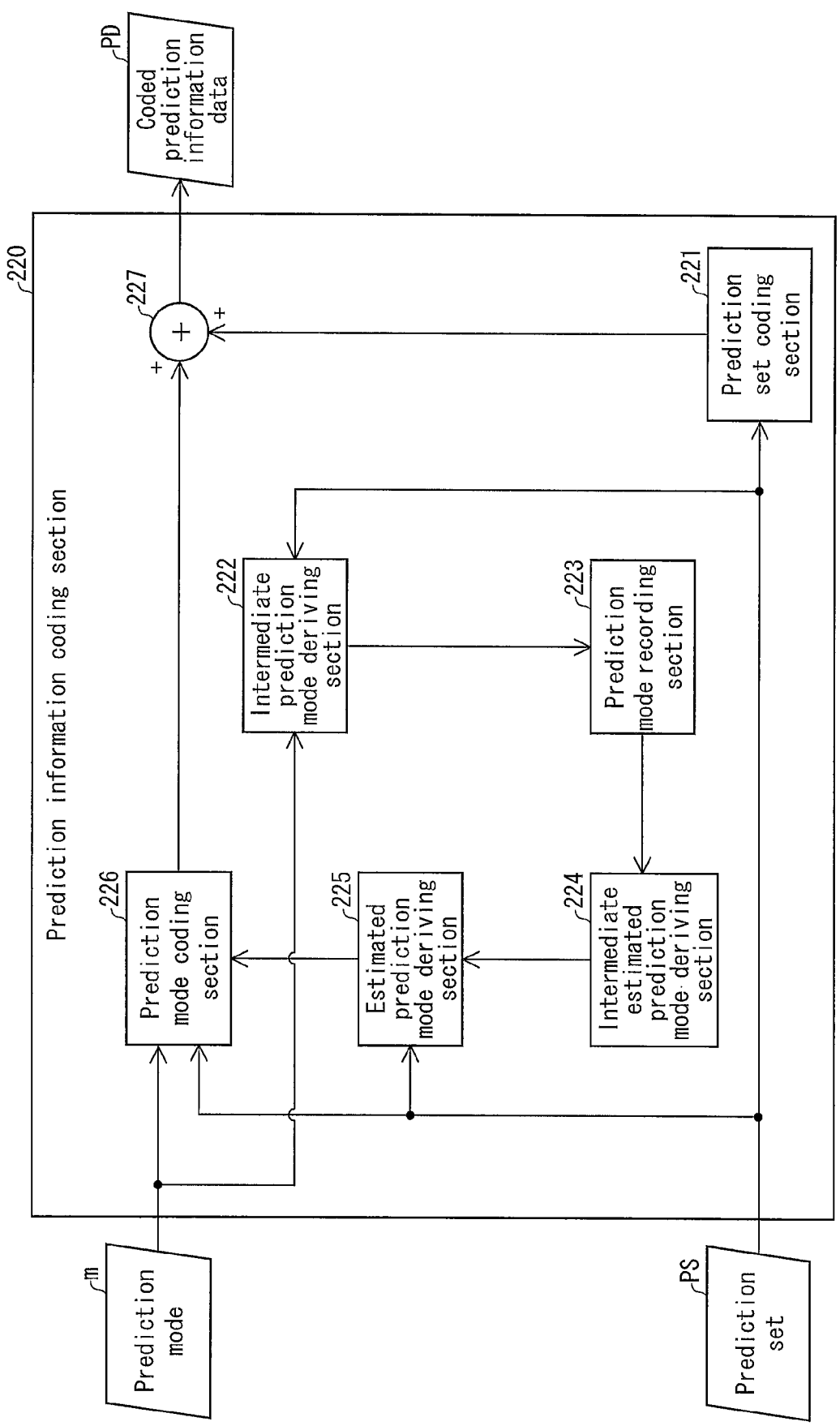
FIG. 15 is a functional block diagram schematically showing a configuration of a prediction information coding section of the moving image encoder.

With reference to FIG. 15, a description will be provided in detail as to the prediction information coding section 220. FIG. 15 is a functional block diagram schematically showing a configuration of the prediction information coding section 220.

As shown in FIG. 15, the prediction information coding section 220 includes a prediction set coding section 221, an intermediate prediction mode deriving section 222, a prediction mode recording section 223, an intermediate estimated prediction mode deriving section (intermediate transform means) 224, an estimated prediction mode deriving section (estimated prediction mode deriving means) 225, and a prediction mode coding section 226, and an adder 227.

The intermediate prediction mode deriving section 222, the prediction mode recording section 223, the intermediate estimated prediction mode deriving section 224, and the estimated prediction mode deriving section 225 have functions similar to those of the intermediate prediction mode deriving section 122, the prediction mode recording section 123, the intermediate estimated prediction mode deriving section 124, and the estimated prediction mode deriving section 125, respectively, of the prediction information decoding section 120 in the moving image decoder 1 which has been described with reference to FIG. 1, and their specific explanations are therefore omitted hereinafter.

The prediction set coding section 221 codes the prediction set PS of the target partition, and then supplies, to the adder 227, the prediction set PS thus coded.

The intermediate prediction mode deriving section 222 transforms the prediction mode m of the target partition into an intermediate prediction mode which is a prediction mode of an intermediate prediction set.

The prediction mode recording section 223 records the intermediate prediction mode, of the target partition, which has been derived by the intermediate prediction mode deriving section 222.

Based on intermediate prediction modes of partitions neighboring to the target partition which are recorded in the prediction mode recording section 223, the intermediate estimated prediction mode deriving section 224 derives an intermediate estimated prediction mode which is an intermediately estimated prediction mode of the target prediction. The intermediate estimated prediction mode deriving section 224 supplies the intermediate estimated prediction mode thus derived to the estimated prediction mode deriving section 225.

The estimated prediction mode deriving section 225 derives an estimated prediction mode from the intermediate estimated prediction mode p' derived by the intermediate estimated prediction mode deriving section 224, and then supplies the estimated prediction mode thus derived to the prediction mode decoding section 226.

The prediction mode coding section 226 codes the prediction mode based on the prediction mode m of the target partition and the estimated prediction mode supplied from the estimated prediction mode deriving section 225, and then supplies the coded prediction mode to the adder 227.

With reference to FIG. 16, the following description more specifically discusses the coding process carried out by the prediction mode coding section 226. FIG. 16 is a table showing the content of the coding process carried out by the prediction mode coding section 226.

In FIG. 16, m indicates a prediction mode of the target partition and p indicates an estimated prediction mode. binary(x, n) is a function for converting x into a string of n bits expressed in binary number. n is a value derived from n=ceil(log 2(a−1)). a is the number of a prediction mode contained in a prediction set, and ceil function is a function that returns the number obtained by rounding up the decimal fraction of an argument.

As shown in FIG. 16, the prediction mode coding section 226 codes flag_bit and rem_bits based on the prediction mode m of the target partition and the estimated prediction mode p supplied from the estimated prediction mode deriving section 225. In a case where the prediction mode m is equal to the estimated prediction mode p (m=p), the prediction mode coding section 226 codes flag_bit being "1", and omits coding of rem_bits. That is, flag_bit being "1" indicates that the prediction mode of the target partition is equal to the estimated prediction mode estimated from the neighbor partitions.

In a case where the prediction mode m is smaller than the estimated prediction mode p (m<p), the prediction mode coding section 226 sets flag_bit to "0" and sets rem_bits to binary(m, n), and codes flag_bit and rem_bits thus set.

On the other hand, in a case where the prediction mode m is larger than the estimated prediction mode p (m>p), the prediction mode coding section 226 sets flag_bit to "0" and sets rem_bits to binary(m−1, n), and codes flag_bit and rem_bits thus set.

(Flow of Process)

Figure 17:
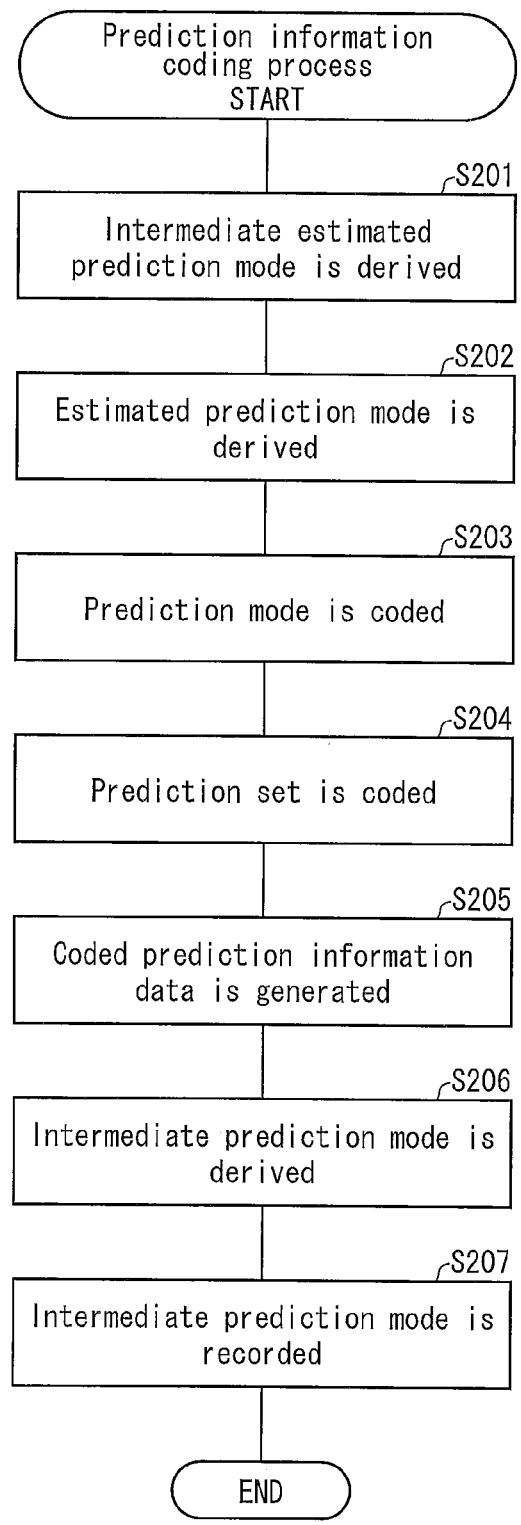
FIG. 17 is a flowchart showing the flow of a prediction information coding process carried out in the moving image encoder.

Next, with reference to FIG. 17, a description will be provided below as to a flow of a prediction information coding process carried out by the prediction information coding section 220 of the moving image encoder 2. FIG. 17 is a flowchart showing the flow of the prediction information coding process carried out in the moving image encoder 2.

When the prediction information coding process starts, the intermediate estimated prediction mode deriving section 224 derives an intermediate estimated prediction mode of the target partition by using the intermediate prediction modes of the partitions neighboring to the target partition which are recorded in the prediction mode recording section 223 (S201).

Subsequently, based on the intermediate estimated prediction mode derived by the intermediate estimated prediction mode deriving section 224, the estimated prediction mode deriving section 225 derives an estimated prediction mode corresponding to the prediction set of the target partition (S202).

Next, the prediction mode coding section 226 codes flag_bit and rem_bits by using the prediction mode m of the target partition and the estimated prediction mode p derived by the estimated prediction mode deriving section 125 (S203), and the prediction set coding section 221 codes the prediction set PS (S204).

Then, the adder 227 generates the coded prediction information data PD containing the prediction mode coded by the prediction mode coding section 226 and the prediction set coded by the prediction set coding section 221 (S205).

Here, the intermediate prediction mode deriving section 222 derives the intermediate prediction mode of the target partition based on the intermediate prediction set, the prediction mode m, and the prediction set PS (S206), and the prediction mode recording section 223 records the intermediate prediction mode derived by the intermediate prediction mode deriving section 222 (S207).

(Operation and Effect)

As described above, the moving image encoder 2 is a moving image encoder for coding a moving image #10 based on an estimation of a prediction mode of a target partition to be intra-predicted, which estimation is made based on prediction modes of partitions neighboring to the target partition, and includes: (i) the intermediate estimated prediction mode deriving section 224 for transforming the prediction modes of the neighbor partitions into intermediate prediction modes contained in an intermediate prediction set which is a sum of prediction sets PS for partitions to be intra-predicted; and (ii) the estimated prediction mode deriving section 225 for deriving an estimated prediction mode by estimating a prediction mode of the target partition based on the intermediate prediction modes of the neighbor partitions obtained as a result of the transform.

With the arrangement, it is possible to improve accuracy in estimating a prediction mode of the target partition.

(Modifications)

The following description will discuss preferable modifications of the moving image decoder 1 and the moving image encoder 2.

[Modification Example of Estimated Prediction Mode Deriving Section]

A description was provided above as to a case where the estimated prediction mode deriving section 125 of the moving image decoder 1 derives an estimated prediction mode p by transforming an intermediate estimated prediction mode p' in accordance with a predetermined rule. However, the present embodiment is not limited to this. The estimated prediction mode deriving section 125 may derive an estimated prediction mode by a predetermined calculation.

The estimated prediction mode deriving section 125 finds the ID of the estimated prediction mode p from the ID of the intermediate estimated prediction mode p' in a case where each of the prediction sets meets conditions (1) and (2) below.

Condition (1): the order of prediction modes contained in each prediction set should be equal to the ascending order of angles. Condition (2): in a case where the number assigned to a prediction set increases, the number of applicable prediction directions is doubled.

Namely, Condition (2) intends to mean that the number of applicable prediction directions of (n+1)-th prediction set is twice of that of n-th prediction set.

To put it the other way around, the number of applicable prediction directions of the n-th prediction set is half of the number of applicable prediction directions of the (n+1)-th prediction set.

To put it another way, prediction modes contained in the (n+1)-th prediction set can be omitted appropriately sequentially from the last in order. This allows the number of prediction modes contained in n-th prediction set to be half of the number of prediction directions contained in (n+1)-th prediction set.

In this case, the intermediate estimated prediction mode is a directional prediction, and the intermediate prediction set is constituted by prediction mode(s) of a directional prediction.

In a case where each prediction set meets the conditions (1) and (2), the estimated prediction mode deriving section 125 derives an estimated prediction mode based on the following calculation.

The following description will discuss a specific example method for transforming an intermediate prediction set M1 into prediction sets PS1 through PS3 as has been already described. Note that, in the following description, planar direction contained in the intermediate prediction set M1 and the prediction sets PS1 through PS3 are not considered.

In a case of finding a prediction mode of the prediction set PS3, p=p'. Since the prediction set PS3 is equal to the intermediate prediction set M1, the intermediate estimated prediction mode p' is derived, as it is, as the estimated prediction mode p.

In a case of finding a prediction mode in the prediction set PS2, p=p'>>1 is calculated. ">>" indicates right shift calculation. That is, in this calculation, intermediate prediction modes with even-numbered IDs (ID: 0, 2, 4, 6, 8, 10, 12, 14) of the intermediate prediction set M1 are mapped on the prediction set PS2 (ID: 0-7) by shift calculation.

In a case of finding a prediction mode of the prediction set PS1, p=(p'-2)>>2 is calculated. That is, in this calculation, a result of removing ID: 14 (the last in order) and ID: 13 (the last but one in order) from the intermediate prediction set M1 is mapped, by shift calculation, on the prediction set PS1 (ID: 0-2).

As described above, the estimated prediction mode deriving section 125 derives the estimated prediction mode p based on a calculation of the intermediate estimated prediction mode p'.

Note that the estimated prediction mode deriving section 225 of the moving image encoder 2 also can derive the estimated prediction mode p by the above-described calculation.

[Transform from Plane Prediction into Directional Prediction]

In a case of transforming a prediction mode, the estimated prediction mode deriving section 125 of the moving image decoder 1 can transform plane prediction into directional prediction as follows.

Such transform is made on the assumption that the intermediate estimated prediction mode p' is plane prediction and the prediction set of the target partition does not include a plane prediction but includes a directional prediction.

The following supplemental description will be provided for such a plane prediction. The plane prediction is a prediction mode selectable in a case where the target partition is constituted by 16×16 pixels. The plane prediction is a prediction mode in which pixel values of the target partition are determined in accordance with a planar prediction while using decoded pixel values of respective reference pixels neighboring to the target partition.

Specifically, according to the plane prediction, a predicted image is generated based on (i) a gradient gx of a reference pixel in a partition which is neighbor on an upper side of the target partition (hereinafter, referred to as upper-side reference pixel) and (ii) a gradient gy of a reference pixel in a partition which is neighbor on a left side of the target partition (hereinafter, referred to as left-side reference pixel).

The following description will discuss, with reference to FIG. 21, how the estimated prediction mode deriving section 125 transforms plane prediction into a directional prediction. Note that it is assumed in the following description that pixels of the target partition which is constituted by 16×16 pixels are specified by coordinates (x, y) (x=0-15, y=0-15).

In FIG. 21, (i) x and y represent axes indicating positions (coordinates) of pixels in the target partition, and (ii) z represents an axis indicating a modified pixel value (luminance value). A modified pixel value of each coordinates is obtained by subtracting a luminance value at coordinates (0, 0) from a luminance value of the coordinates. Here, a modified pixel value of coordinates $(x_0, y_0)$ can be expressed as a point on a plane defined by a vector $(x_0, 0, x_0*gx)$ and a vector $(0, y_0, y_0*gy)$, i.e. a plane defined by a vector (1, 0, gx) and a vector (0, 1, gy).

Since a prediction direction is a direction in which pixel values are not changed (i.e. a contour line direction of pixel values), a vector v representing a prediction direction is a vector on x-y plane, and is perpendicular to a vector normal to the plane defined by the vector (1, 0, gx) and the vector (0, 1, gy).

As such, the vector v representing a prediction direction can be expressed as v=(gy, −gx, 0).

The estimated prediction mode deriving section 125 thus transforms a plane prediction into a directional prediction by obtaining, from the gradients gx and gy, the vector v representing a prediction direction.

This is applicable to the estimated prediction mode deriving section 225 of the moving image encoder 2.

[Intermediate Prediction Set]

The intermediate prediction set M1 explained with reference to FIG. 9 is equal to the prediction set PS3. However, the present embodiment is not limited to this, and the intermediate prediction set may not be equal to one of prediction sets of respective partitions.

As described above, the intermediate prediction set may be a sum of prediction sets of respective partitions. The following describes examples of such intermediate prediction sets with reference to FIGS. 18 and 19.

Figure 18:
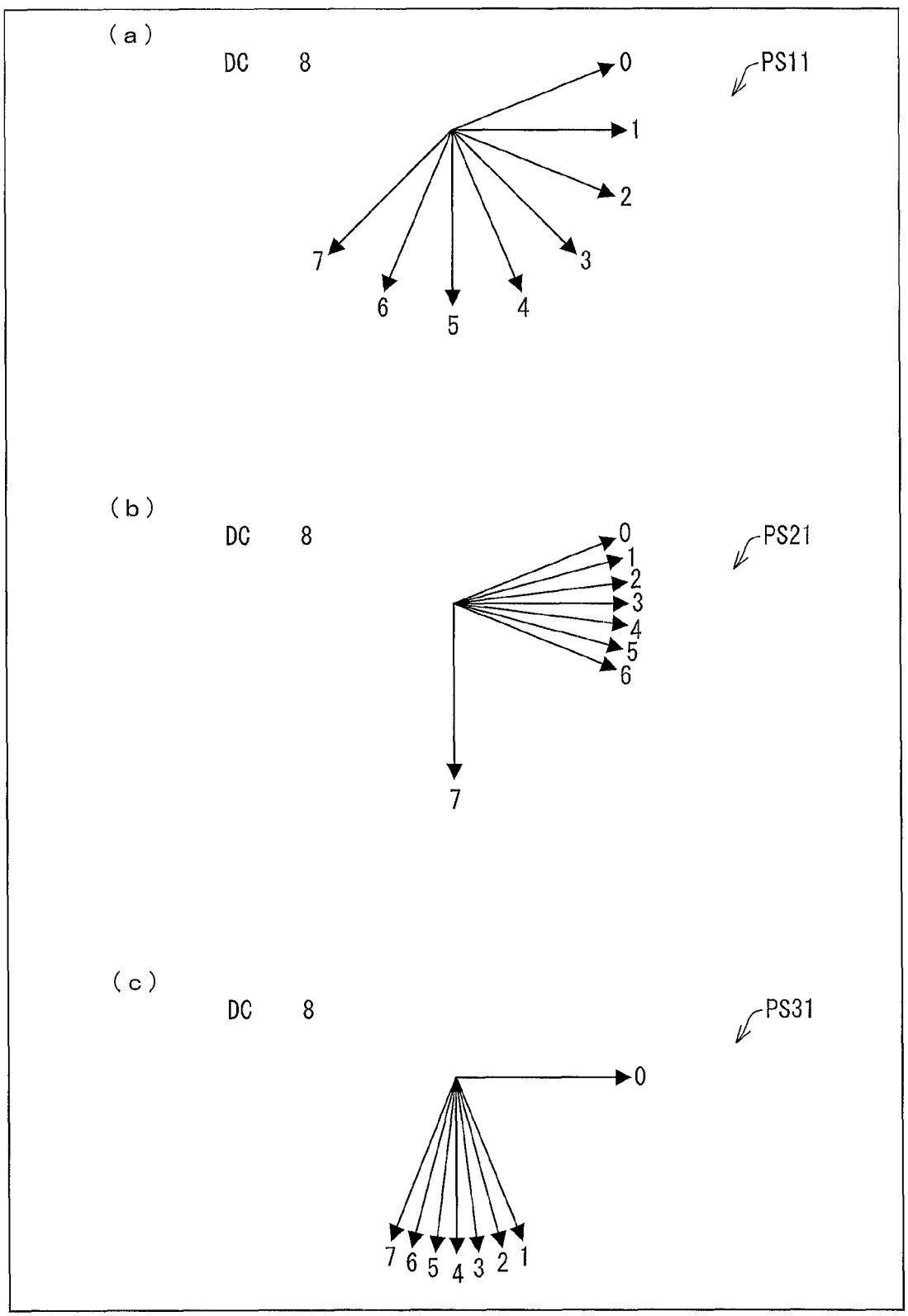
FIG. 18 is a view showing other examples of prediction sets. (a) to (c) of FIG. 18 show three kinds of prediction sets.

(a) to (c) of FIG. 18 show examples of three kinds of prediction sets: PS11, PS11, and PS31. As shown in (a) of FIG. 18, the prediction set PS11 includes eight kinds of directional predictions (ID: 0-7) and DC prediction (ID: 8) as in the case of the prediction set PS2 shown in (b) of FIG. 5.

As shown in (b) of FIG. 18, the prediction set PS21 includes eight kinds of directional predictions (ID: 0-7) and DC prediction (ID: 8) as in the case of the prediction set PS11. However, prediction directions of ID: 0-6 are limited to a horizontal direction. This indicates that the prediction set PS21 is a prediction set with a high priority on prediction in horizontal direction.

As shown in (c) of FIG. 18, the prediction set PS31 includes eight kinds of directional predictions (ID: 0-7) and DC prediction (ID: 8) as in the case of the prediction set PS11. However, prediction directions of ID: 1-7 are limited to a vertical direction. This indicates that the prediction set PS31 is a prediction set with a high priority on prediction in vertical direction.

Figures 19, 20:
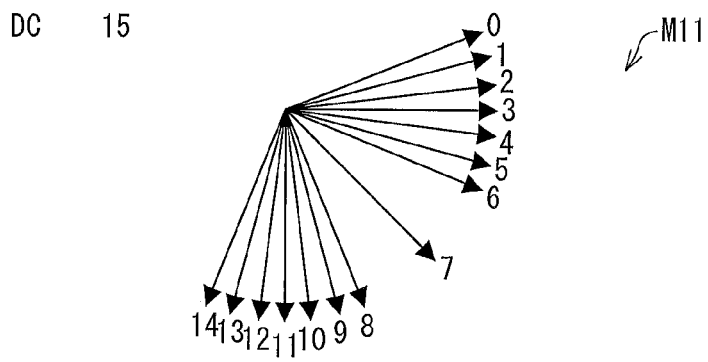
FIG. 19 is a view showing an example of an intermediate prediction set generated from the three kinds of prediction sets.
FIG. 20 is a view showing an identifier for a prediction set reexpressed as a vector.
Figure 22:
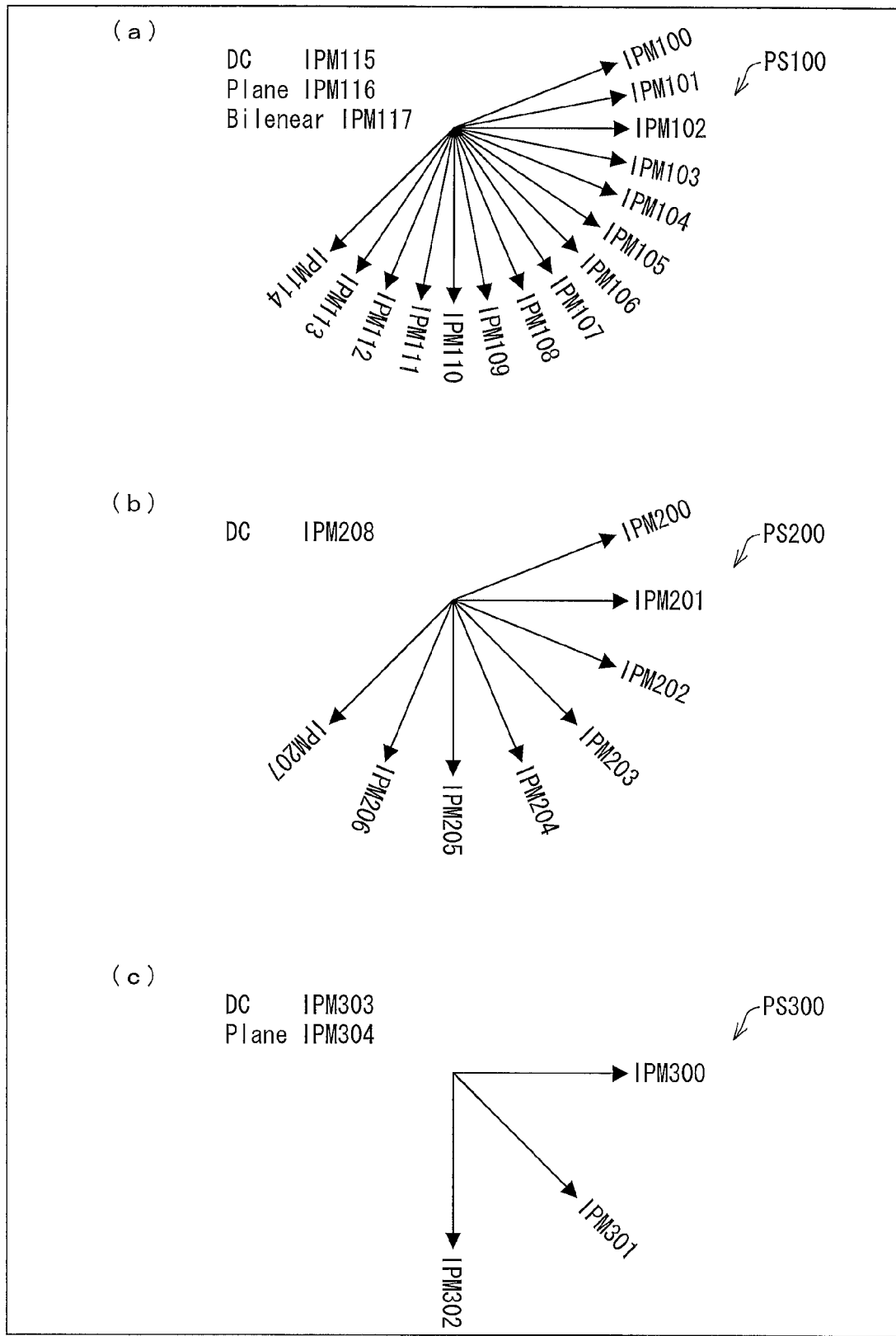
FIG. 22 is a view exemplifying conventional prediction sets. (a) to (c) of FIG. 22 show three kinds of prediction sets, respectively.
Figure 23:
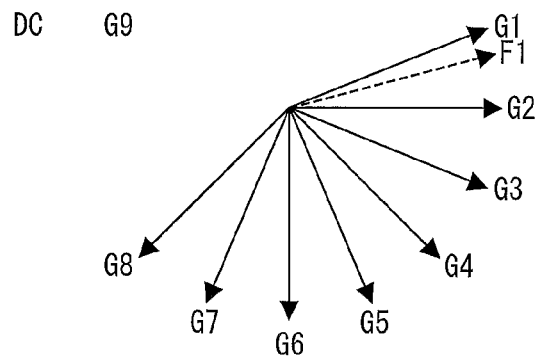
FIG. 23 is a view showing a conventional prediction group.
Figure 24:
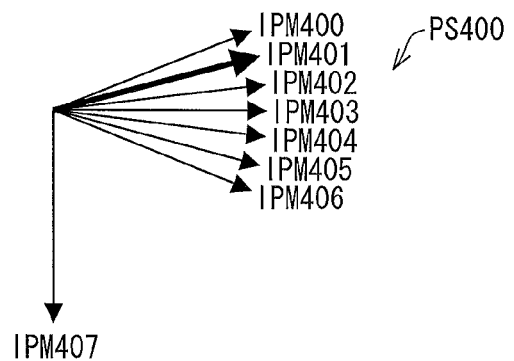
FIG. 24 is a view showing another example of a conventional prediction set.

With respect to such prediction sets PS11, PS21, and PS31, an intermediate prediction set M11 shown in FIG. 19 may be generated.

The intermediate prediction set M11 is a sum of the prediction sets PS11, PS21, and PS31, and includes fifteen kinds of directional predictions (ID: 0-7) and DC prediction (ID: 8). None of the prediction sets PS11, PS21, and PS31 is equal to the intermediate prediction set M11, but any of the prediction sets PS11, PS21, and PS31 is a subset of the intermediate prediction set M11. That is, a prediction mode included in individual prediction sets is always included in the intermediate prediction set M11.

As described above, the intermediate prediction set M11 is only required to be a sum of prediction sets of respective partitions, and is not necessarily required to be equal to one of the prediction sets.

[Identifier of Intermediate Prediction Mode]

The intermediate prediction set M1 shown in FIG. 10 employs intermediate prediction mode IDs (ID: 0-16) as identifiers of prediction modes included in the intermediate prediction set M1. The intermediate prediction set IDs are sequential numbers, i.e. indices of integers which increment by one. Alternatively, identifiers of intermediate prediction modes may be vectors.

For example, the identifier of the intermediate prediction mode may be expressed as a vector consisting of two components: "prediction classification" and "prediction characteristic parameter".

In this case, a vector serving as an identifier of the intermediate prediction mode can be expressed as (prediction classification, prediction characteristic parameter)≡(et, ep).

"Directional" indicating that the kind of the intermediate prediction mode is "directional prediction" or "planar" indicating that the kind of the intermediate prediction mode is "planar prediction" is designated as the prediction classification.

The prediction characteristic parameter is a parameter for finally specifying the intermediate prediction mode, and is determined according to the prediction classification.

When the prediction classification is "directional", a parameter which specifies a prediction direction is designated as the prediction characteristic parameter. For example, a parameter which specifies an angle of a prediction direction is designated as the prediction characteristic parameter.

When the prediction classification is "planar", a rank order (rank) of an occurrence probability of a prediction mode classified as planar direction is designated as the prediction characteristic parameter.

With reference to FIG. 20, the following describes specific examples of expressing an identifier of an intermediate prediction mode as a vector. A description is provided below as to a case where the identifiers of the intermediate prediction set M1 shown in FIG. 9 are expressed as vectors. FIG. 10 shows an example where identifiers of the intermediate prediction set M1 are expressed as IDs, whereas FIG. 20 shows an example where identifiers of the intermediate prediction set M1 are expressed as vectors.

That is, since intermediate prediction modes "angle (22.5)" to "angle(−135)" to which ID: 0-14 are assigned in FIG. 10 are directional predictions, "directional" is designated as the prediction classification (et). In this case, "22.5" to "−135" indicating angles of respective prediction directions are designated as the prediction characteristic parameter (ep).

Since intermediate prediction modes "DC" and "Plane" to which ID: 15 and 16 are assigned in FIG. 10 are planar directions, "planar" is designated as the prediction classification (et). In this case, "0" and "1" indicating the rank orders of occurrence probabilities of the intermediate prediction modes "DC" and "Plane" respectively are designated as the prediction characteristic parameter (ep).

In a case where the identifier of the intermediate prediction mode is changed as above, the intermediate estimated prediction mode deriving section 124 of the moving image decoder 1 may derive an intermediate estimated prediction mode by a method below according to intermediate prediction modes derived for neighbor partitions.

Initially, in a case where intermediate prediction modes with different prediction classifications are derived for partitions neighboring to the left side and the upper side of the target partition, the intermediate estimated prediction mode deriving section 124 derives an intermediate estimated prediction mode p'=(planar, 0). In other words, in a case where one of the partitions neighboring to the left side and the upper side of the target partition is planar prediction and the other is directional prediction, the intermediate estimated prediction mode deriving section 124 derives DC prediction as the intermediate estimated prediction mode p'.

In a case where a prediction mode classified as planar prediction is derived as the intermediate prediction mode of both of partitions neighboring to the left side and the upper side of the target partition, the intermediate estimated prediction mode deriving section 124 derives an intermediate estimated prediction mode p'=(planar, min($e_{p,x}$)). Here, $e_{p,x}$ is a set of prediction characteristic parameters for the intermediate prediction modes derived for the neighbor partitions.

That is, in this case, the intermediate estimated prediction mode deriving section 124 derives, as the intermediate estimated prediction mode p', one of the intermediate prediction modes derived for the neighbor partitions which one has the smallest prediction characteristic parameter, i.e. has the highest rank order of an occurrence probability.

In a case where a prediction mode classified as directional prediction is derived as the intermediate prediction mode of both of partitions neighboring to the left side and the upper side of the target partition, the intermediate estimated prediction mode deriving section 124 derives an intermediate estimated prediction mode p'=(planar, avg($e_{p,x}$)). Here, avg function is a function that returns an average of arguments. That is, in this case, the intermediate estimated prediction mode deriving section 124 derives, as the intermediate estimated prediction mode p', an intermediate prediction mode whose angle is an average of angles of intermediate prediction modes derived for the neighbor partitions.

In a case where there is no intermediate prediction mode whose angle is an average of angles of intermediate prediction modes derived for the neighbor partitions, the intermediate estimated prediction mode deriving section 124 can derive, as the intermediate estimated prediction mode p', an intermediate prediction mode whose angle is closer to the average.

The above method is applicable to the intermediate estimated prediction mode deriving section 224 of the moving image encoder 2.

(Conclusion)

The present invention is not limited to the description of the embodiments above, but may be altered by a skilled person within the scope of the claims. An embodiment based on a proper combination of technical means disclosed in different embodiments is encompassed in the technical scope of the present invention.

Lastly, each block of the moving image decoder 1 and the moving image encoder 2 may be realized by hardware logic using a logic circuit on an integrated circuit (IC chip) or may be realized by software by using CPUs (Central Processing Unit).

In the latter case, the moving image decoder 1 and the moving image encoder 2 each include: CPUs for executing a program for realizing functions; ROMs (read only memory) that store the program; RAMs (random access memory) that develop the program; storage devices such as memories that store the program and various data; and the like. The object of the present invention can be realized in such a manner that the moving image decoder 1 and the moving image encoder 2 are provided with a computer-readable storage medium for storing program codes (such as executable program, intermediate code program, and source program) of programs of the moving image decoder 1 and the moving image encoder 2 which programs serve as software for realizing the functions, and a computer (alternatively, CPU or MPU) reads out and executes the program codes stored in the storage medium.

The storage medium is, for example, tapes such as a magnetic tape and a cassette tape, or discs such as magnetic discs (e.g. a floppy Disc® and a hard disc), and optical discs (e.g. CD-ROM, MO, MD, DVD, CD-R, blu-ray Disc®). Further, the storage medium may be cards such as an IC card (including a memory card) and an optical card, or semiconductor memories such as mask ROM, EPROM, EEPROM, and flash ROM, or logic circuits such as PLD (Programmable logic device) and FPGA (Field Programmable Gate Array).

Further, the moving image decoder 1 and the moving image encoder 2 may be arranged so as to be connectable to a communication network so that the program code is supplied to the moving image decoder 1 and the moving image encoder 2 through the communication network. The communication network is not particularly limited. Examples of the communication network include the Internet, intranet, extranet, LAN, ISDN, VAN, CATV communication network, virtual private network, telephone network, mobile communication network, and satellite communication network. Further, a transmission medium that constitutes the communication network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared ray, Bluetooth®, 802.11, HDR (High Data Rate), NFC (Near Field Communication), DLNA (Digital Living Network Alliance), mobile phone network, satellite connections, and terrestrial digital network.

(Additional Matter 1: Correspondence Between Prediction Mode ID and Intermediate Prediction Mode ID)

An explanation was made above as to an example in which a prediction mode ID is not necessarily equal to an intermediate prediction mode ID.

For example, in the correspondence table TBL1 shown in (a) of FIG. 8, the intermediate prediction mode ID: 2 is assigned to the prediction mode ID: 0.

In the correspondence table TBL2 shown in (b) of FIG. 8, the intermediate prediction mode ID: 0 is assigned to the prediction mode ID: 0 and the prediction mode ID is equal to the intermediate prediction mode ID. However, the intermediate prediction mode ID: 1 is assigned to the prediction mode ID: 1 and the prediction mode ID is not equal to the intermediate prediction mode ID.

On the other hand, in the correspondence table TBL3 shown in (c) of FIG. 8, the prediction mode IDs are equal to the intermediate prediction mode IDs, respectively.

However, the present invention is not limited to this, and when one of prediction sets for individual partitions is equal to an intermediate prediction set which is a sum of the prediction sets, it is possible to cause a prediction mode ID in each prediction set and an intermediate prediction mode ID to have the same value.

That is, it is possible to assign IDs in the correspondence tables TBL1 and TBL2 in the same manner as in the correspondence table TBL3.

For example, the prediction sets shown in (a) to (c) of FIG. 6 are configured as follows. When a prediction mode in the prediction set PS1 shown in (a) of FIG. 6 and a prediction mode in the prediction set PS2 shown in (b) of FIG. 6 are equal to a prediction mode in the prediction set PS3 shown in (c) of FIG. 6, the prediction mode in the prediction set PS1 and the prediction mode in the prediction set PS2 are given the same prediction mode ID as that of the prediction mode in the prediction set PS3.

A specific example is as follows. In the prediction set PS3, a prediction mode in a right-horizontal direction is assigned "2" as a prediction mode ID.

When the prediction mode ID: 0 in a right-horizontal direction of the prediction set PS1 is assigned "2" and the prediction mode ID: 1 in a right-horizontal direction of the prediction set PS2 is assigned "2", it is possible to cause an intermediate prediction mode ID to be equal to a prediction mode ID with respect to the prediction mode in a right-horizontal direction.

In this case, transform from the intermediate prediction mode ID to the prediction mode ID carried out by the intermediate estimated prediction mode deriving section 124 is transform between the same numeral.

(Additional Matter 2)

The present invention may be expressed as follows. The decoding device of the present invention is a decoding device for decoding coded image data based on an estimation of a prediction mode of a target region to be intra-frame predicted, which estimation is made based on a prediction mode of one or more neighbor regions which are neighboring to the target region, including: intermediate transform means for transforming said one or more prediction modes of said one or more neighbor regions into one or more intermediate prediction modes which is a prediction mode in an intermediate prediction set which is a sum of sets of prediction modes which are applicable to respective regions to be intra-frame predicted; and estimated prediction mode deriving means for deriving an estimated prediction mode by estimating the prediction mode of the target region based on said one or more intermediate prediction modes of said one or more neighbor regions which is obtained by the transform.

The coding device of the present invention is a coding device for coding image data based on an estimation of a prediction mode of a target region to be intra-frame predicted, which estimation is made based on one or more prediction modes of one or more neighbor regions which are neighboring to the target region, including: intermediate transform means for transforming said one or more prediction modes of said one or more neighbor regions into one or more intermediate prediction modes which is a prediction mode in an intermediate prediction set which is a sum of sets of prediction modes which are applicable to respective regions to be intra-frame predicted; and estimated prediction mode deriving means for deriving an estimated prediction mode by estimating the prediction mode of the target region based on said one or more intermediate prediction modes of said one or more neighbor regions which is obtained by the transform.

With the arrangement, when the prediction mode of the target region is estimated, said one or more prediction modes of said one or more neighbor regions can be transformed into one or more intermediate prediction modes in an intermediate prediction set which is a sum of sets of prediction modes which are applicable to said one or more neighbor regions, and the prediction mode of the target region can be estimated based on the intermediate prediction mode obtained by the transform.

The intermediate prediction set includes all prediction modes applicable to said one or more neighbor regions. Timing for transforming the prediction mode of the neighbor region into the intermediate prediction mode of the neighbor region is not particularly limited. The transform may be made in advance when estimating the prediction mode of the neighbor region, or every time when estimating the prediction mode of the target region.

With the arrangement, even when applicable prediction modes are different between regions, it is possible to use a prediction mode of a neighbor region in estimating a prediction mode of the target region. Accordingly, it is possible to avoid a situation, for example, that the prediction mode derived as the estimated prediction mode is limited to a representative of grouped prediction modes.

This allows yielding an effect of improving accuracy in estimating the prediction mode of the target region.

It is preferable to arrange the decoding device of the present invention such that the estimated prediction mode deriving means derives the estimated prediction mode by (i) deriving an intermediate prediction mode of the target region from said one or more intermediate prediction modes of said one or more neighbor regions and (ii) transforming a derived intermediate prediction mode of the target region into a prediction mode applicable to the target region.

With the arrangement, the derived intermediate prediction mode of the target region can be appropriately transformed into a prediction mode applicable to the target region. If the derived intermediate prediction mode of the target region would not be transformed, an estimated prediction mode would not be obtained, so that a prediction mode would not be coded based on the estimated prediction mode, resulting in increase in the amount of codes. In contrast thereto, transform of the derived intermediate prediction mode of the target region always provides an estimated prediction mode, so that the amount of codes does not increase.

It is preferable to arrange the decoding device of the present invention such that the estimated prediction mode deriving means derives, as the intermediate prediction mode of the target region, an intermediate prediction mode with a high estimate of occurrence frequency out of the intermediate prediction modes of the neighbor regions.

With the arrangement, the intermediate prediction mode with a high estimate of occurrence frequency is derived out of the intermediate prediction modes of the neighbor regions, so that a ratio of the estimated prediction mode derived by the decoding device being equal to the prediction mode of the target region is higher.

Consequently, the prediction mode of image data can be coded with fewer codes, so that data to be processed by the decoding device can be reduced.

It is preferable to arrange the decoding device of the present invention so as to further include a recoding section for recording estimates of the respective occurrence frequencies which have been calculated in advance.

With the arrangement, estimates of the respective occurrence frequencies have been calculated in advance and are recorded in the decoding device. The estimates of the occurrence frequencies may be shared by the decoding device and a coding device.

Consequently, it is unnecessary to code the estimates of the occurrence frequencies as side information in coded data. This allows reducing coded data transmitted from the coding device to the decoding device.

It is preferable to arrange the decoding device of the present invention so as to further include acquiring means for acquiring the estimate of the occurrence frequency from a coding device for supplying the coded image data.

With the arrangement, the estimate of the occurrence frequency can be acquired from the coding device for supplying coded data. The estimate of the occurrence frequency may be coded in a header of the coded data supplied from the coding device.

Consequently, even when occurrence frequency of a prediction mode varies depending on a frame unit or a region unit, it is possible to exactly know an estimate of the occurrence frequency, so that accuracy in the derived estimated prediction mode increases.

Furthermore, this allows reducing data to be processed by the decoding device.

It is preferable to arrange the decoding device of the present invention such that, in a case where the derived intermediate prediction mode of the target region is a prediction mode applicable to the target region, the estimated prediction mode deriving means derives, as the estimated prediction mode, the derived intermediate prediction mode of the target region.

With the arrangement, when the intermediate prediction mode of the neighbor region is applicable as the prediction mode of the target region, the derived intermediate prediction mode is derived as the estimated prediction mode. This allows obtaining the estimated prediction mode without a transform process. This allows reducing the frequency of transform.

It is preferable to arrange the decoding device of the present invention such that, in a case where the derived intermediate prediction mode of the target region is classified into a directional prediction, the estimated prediction mode deriving means derives, as the estimated prediction mode, a prediction mode which (i) is classified into a directional prediction, (ii) is applicable to the target region, and (iii) has a difference between an angle of the prediction mode and an angle of the derived intermediate prediction mode of the target region, the difference falling within a predetermined range.

With the arrangement, when the derived intermediate prediction mode of the target region is classified into a directional prediction, a prediction mode which (i) is classified into a directional prediction, (ii) is applicable to the target region, and (iii) has a difference between an angle of the prediction mode and an angle of the derived intermediate prediction mode of the target region, the difference falling within a predetermined range, is derived as the estimated prediction mode.

When a difference in angle of prediction direction between two planar prediction modes is within a predetermined range, the two prediction modes have similar properties.

Accordingly, even when the intermediate prediction mode is not a directional prediction mode applicable to the target region, a prediction mode with properties similar to those of the intermediate prediction mode out of directional prediction modes applicable to the target region can be derived as an estimated prediction mode.

This allows improving accuracy in estimating a prediction mode classified into directional prediction.

It is preferable to arrange the decoding device of the present invention such that, in a case where the derived intermediate prediction mode of the target region is classified into a planar prediction, the estimated prediction mode deriving means derives, as the estimated prediction mode, a prediction mode with a high estimate of the occurrence frequency out of prediction modes which are classified into a planar prediction and are applicable to the target region.

With the arrangement, when the derived intermediate prediction mode of the target region is classified into a planar prediction, a prediction mode with a high estimate of the occurrence frequency out of prediction modes which are classified into a planar prediction and are applicable to the target region is derived as the estimated prediction mode.

As described above, even when the intermediate prediction mode is not a planar prediction mode applicable to the target region, a prediction mode with high occurrence frequency out of planar prediction modes applicable to the target region is derived as the estimated prediction mode, so that accuracy in estimating the prediction mode can be improved.

It is preferable to arrange the decoding device of the present invention such that the intermediate prediction mode is identified by (i) a classification of prediction modes and (ii) a parameter indicative of a characteristic of the classification, and the estimated prediction mode deriving means derives the intermediate prediction mode of the target region in accordance with the classification and the parameter.

With the arrangement, even when intermediate prediction modes of individual neighbor regions are classified differently, the optimal intermediate prediction mode can be derived for the target region in accordance with the classification and the parameter.

This allows improving accuracy in estimating the prediction mode.

(Additional Matter 3)

In the above embodiments, the macroblock corresponds to a LCU (Largest Coding Unit, also referred to as root of Coding Tree) of HEVC (High Efficiency Video Coding) proposed as a standard succeeding to H. 264/MPEG-4 AVC. The macroblock and block correspond to a CU (Coding Unit, also referred to as leaf of Coding Tree), a PU (Prediction Unit), or a TU (Transformation Unit) of HEVC. The LCU may be also referred to as a tree block.

(Additional Matter 4)

The invention being thus described with reference to drawings, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention is preferably applicable to a moving image processing system including a moving image encoder for coding a moving image and a moving image decoder for decoding the coded moving image, such as a digital television broadcasting system and a moving image distribution system.

REFERENCE SIGNS LIST

1 Moving image decoder (decoding device)
2 Moving image encoder (coding device)
120 Prediction information decoding section
122 Intermediate prediction mode deriving section
123 Prediction mode recording section 124 Intermediate estimated prediction mode deriving section (intermediate transform means)
125 Estimated prediction mode deriving section (estimated prediction mode deriving means)
220 Prediction information coding section
222 Intermediate prediction mode deriving section
223 Prediction mode recording section
224 Intermediate estimated prediction mode deriving section (intermediate transform means)
225 Estimated prediction mode deriving section (estimated prediction mode deriving means)

The invention claimed is:

1. A decoding device for decoding coded data, the decoding device comprising:
a prediction mode deriving circuitry that derives an intra prediction mode of a target block using a prediction mode index, wherein the intra prediction mode indicates one of directional prediction modes; and
a predicted image generating circuitry that generates a predicted image using the intra prediction mode,
wherein:
the intra prediction mode is set equal to one of the directional prediction modes included in one of at least three prediction sets,
a first set of the at least three prediction sets has more directional prediction modes that refer left neighboring pixels neighboring to a left side of the target block than a second set of the at least three prediction sets, and
a third set of the at least three prediction sets has more directional prediction modes that refer upper neighboring pixels neighboring to an upper side of the target block than the second set, wherein
in a case that a value of a flag specifying whether a prediction mode is predicted from a neighboring block is equal to a first value, a value of the intra prediction mode is set equal to a first estimated prediction mode, and
otherwise and in a case that a prediction mode which is set by using remainder information is greater than a second estimated prediction mode, a value of the prediction mode is incremented by one.

2. A encoding device for encoding image data, the encoding device comprising:
a prediction mode deriving circuitry that derives an intra prediction mode of a target block using a prediction mode index, wherein the intra prediction mode indicates one of directional prediction modes; and
a predicted image generating circuitry that generates a predicted image using the intra prediction mode,
wherein:
the intra prediction mode is set equal to one of the directional prediction modes included in one of at least three prediction sets,
a first set of the at least three prediction sets has more directional prediction modes that refer left neighboring pixels neighboring to a left side of the target block than a second set of the at least three prediction sets, and
a third set of the at least three prediction sets has more directional prediction modes that refer upper neighboring pixels neighboring to an upper side of the target block than the second set, wherein:
in a case that a value of a flag specifying whether a prediction mode is predicted from a neighboring block is equal to a first value, a value of the intra prediction mode is set equal to a first estimated prediction mode, and
otherwise and in a case that a prediction mode which is set by using remainder information is greater than a second estimated prediction mode, a value of the prediction mode is incremented by one.

3. A method for decoding coded data, the method including:
deriving an intra prediction mode of a target block using a prediction mode index, wherein the intra prediction mode indicates one of directional prediction modes; and
generating a predicted image using the intra prediction mode,
wherein:
the intra prediction mode is set equal to one of the directional prediction modes included in one of at least three prediction sets,
a first set of the at least three prediction sets has more directional prediction modes that refer left neighboring pixels neighboring to a left side of the target block than a second set of the at least three prediction sets, and
a third set of the at least three prediction sets has more directional prediction modes that refer upper neighboring pixels neighboring to an upper side of the target block than the second set, wherein:
in a case that a value of a flag specifying whether a prediction mode is predicted from a neighboring block is equal to a first value, a value of the intra prediction mode is set equal to a first estimated prediction mode and
otherwise and in a case that a prediction mode which is set by using remainder information is greater than a second estimated prediction mode, a value of the prediction mode is incremented by one.

* * * * *